(12) United States Patent
Suzuki

(10) Patent No.: US 7,281,816 B2
(45) Date of Patent: Oct. 16, 2007

(54) SURFACE LIGHTING DEVICE

(75) Inventor: Toshihiro Suzuki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 10/812,846

(22) Filed: Mar. 30, 2004

(65) Prior Publication Data

US 2004/0218388 A1      Nov. 4, 2004

(30) Foreign Application Priority Data

Mar. 31, 2003    (JP)   ............................. 2003-097367

(51) Int. Cl.
*F21V 9/00*     (2006.01)
*F21S 23/04*    (2006.01)
*G09F 13/04*    (2006.01)

(52) U.S. Cl. .................. 362/231; 362/252; 362/97; 362/800

(58) Field of Classification Search ............... 362/231, 362/623–626, 241, 243, 245, 247, 252, 97, 362/800; 349/67; 257/98
See application file for complete search history.

(56) References Cited

U.S. PATENT DOCUMENTS

| | | | | |
|---|---|---|---|---|
| 4,628,422 A | * | 12/1986 | Ewald .................. | 362/240 |
| 5,068,771 A | * | 11/1991 | Savage, Jr. .......... | 362/255 |
| 5,093,768 A | * | 3/1992 | Ohe ...................... | 362/241 |
| 5,164,715 A | * | 11/1992 | Kashiwabara et al. | 345/4 |
| 5,384,658 A | * | 1/1995 | Ohtake et al. ....... | 359/707 |
| 6,007,209 A | * | 12/1999 | Pelka .................... | 362/30 |
| 6,236,382 B1 | * | 5/2001 | Kawakami et al. .. | 345/83 |
| 6,325,524 B1 | * | 12/2001 | Weber et al. ........ | 362/245 |
| 6,330,111 B1 | * | 12/2001 | Myers .................. | 359/599 |
| 6,439,731 B1 | * | 8/2002 | Johnson et al. ..... | 362/29 |
| 6,536,913 B1 | * | 3/2003 | Yajima et al. ....... | 362/231 |
| 6,608,614 B1 | * | 8/2003 | Johnson ............... | 345/102 |
| 6,679,621 B2 | * | 1/2004 | West et al. .......... | 362/327 |
| 6,789,921 B1 | * | 9/2004 | Deloy et al. ........ | 362/252 |
| 6,856,087 B2 | * | 2/2005 | Lin et al. ............. | 313/500 |

(Continued)

FOREIGN PATENT DOCUMENTS

EP             88060              9/1983

(Continued)

*Primary Examiner*—John Anthony Ward
*Assistant Examiner*—David Makiya
(74) *Attorney, Agent, or Firm*—Greer, Burns & Crain, Ltd.

(57) ABSTRACT

A surface lighting device including, a surface light source in which light-emitting element groups having three light-emitting elements, which correspond to three primary colors of light, arranged to be continuous with vertexes of a triangle are arranged in a matrix shape; a substrate on which the light-emitting element groups are arranged; and a diffusion plate which is located above the surface light source. the light-emitting element groups are arranged to be deviated every other column or row such that a positional relation among the light-emitting element groups is a delta shape. Additionally, a row interval, a column interval, and an arrangement angle of the light-emitting element groups are adjusted such that, when it is assumed that an average amount of light calculated from a sum of amounts of light of the respective single color light-emitting elements at a center of gravity of the delta shape and a center of gravity of a diamond shape formed by two delta shapes is between 75% and 125%.

1 Claim, 26 Drawing Sheets

U.S. PATENT DOCUMENTS

| | | | |
|---|---|---|---|
| 6,867,825 B2 * | 3/2005 | Kanatsu et al. | 349/60 |
| 6,883,933 B2 * | 4/2005 | Matsui et al. | 362/231 |
| 6,932,477 B2 * | 8/2005 | Stanton | 353/31 |
| 6,974,229 B2 * | 12/2005 | West et al. | 362/227 |
| 7,036,956 B1 * | 5/2006 | Chou | 362/246 |
| 2002/0001193 A1 * | 1/2002 | Osawa et al. | 362/249 |
| 2002/0071288 A1 | 6/2002 | Lim | |
| 2002/0159002 A1 * | 10/2002 | Chang | 349/61 |
| 2005/0169007 A1 * | 8/2005 | Chou | 362/555 |
| 2006/0087227 A1 * | 4/2006 | Yamanaka | 313/504 |
| 2006/0087866 A1 * | 4/2006 | Ng et al. | 362/612 |
| 2006/0092618 A1 * | 5/2006 | Tanaka et al. | 362/19 |
| 2007/0014098 A1 * | 1/2007 | Park et al. | 362/29 |

FOREIGN PATENT DOCUMENTS

| | | |
|---|---|---|
| JP | 06-018882 | 1/1994 |
| JP | 10-221692 | 8/1998 |
| JP | 2000-294379 | 10/2000 |
| JP | 2001-305975 | 11/2001 |
| JP | 2002-258815 | 9/2002 |
| JP | 2002-311412 | 10/2002 |
| JP | 2002-341797 | 11/2002 |

\* cited by examiner

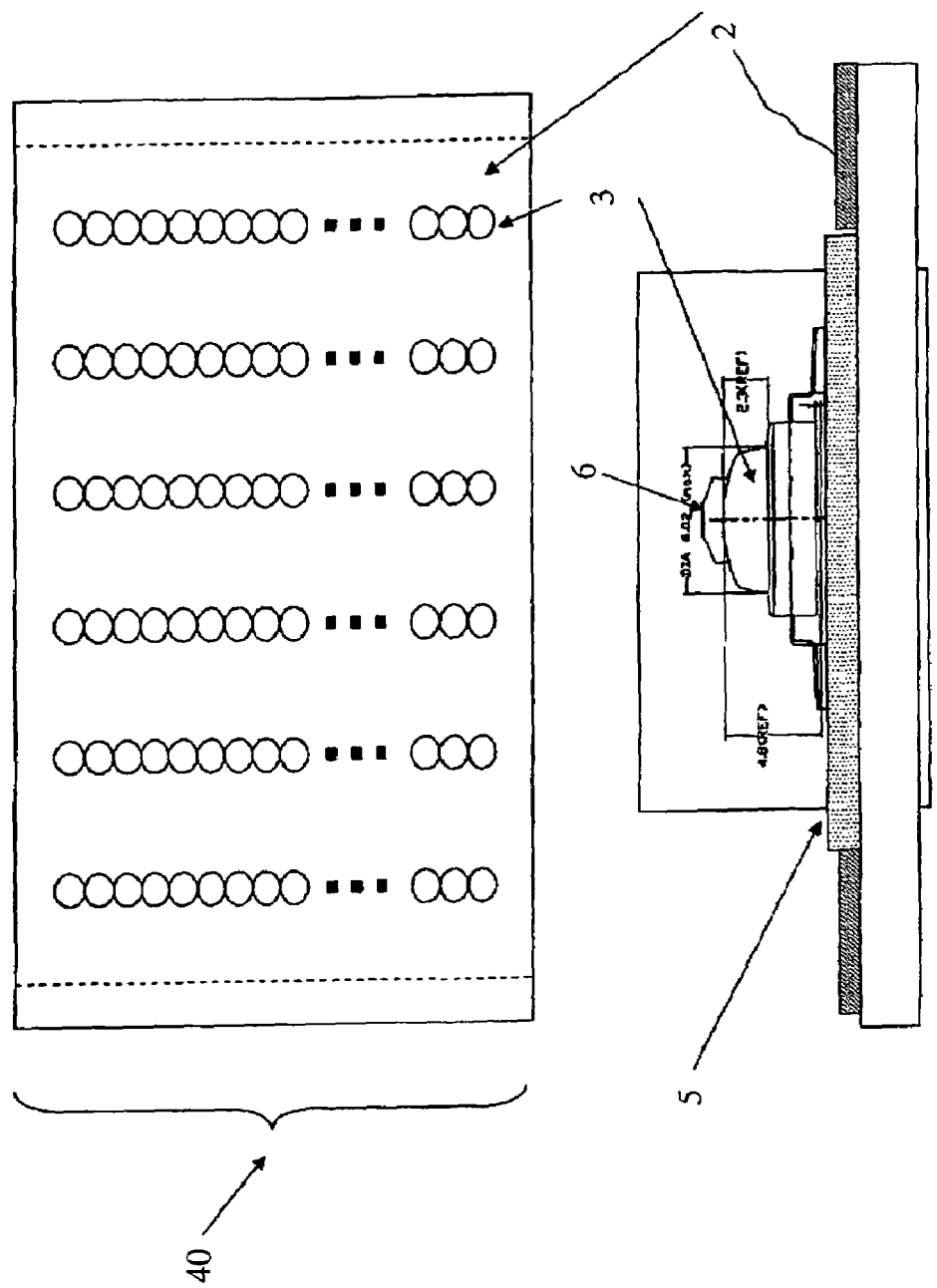

φP: PEAK AMOUNT OF LIGHT, φ0: ANGLE AT IRRADIATION ANGLE
θP: IRRADIATION ANGLE INDICATING PEAK AMOUNT OF LIGHT $\phi P$: PEAK AMOUNT OF LIGHT, $\phi 0$: ANGLE AT IRRADIATION ANGLE φP: PEAK AMOUNT OF LIGHT, φ0: ANGLE AT IRRADIATION ANGLE
θP: IRRADIATION ANGLE INDICATING PEAK AMOUNT OF LIGHT

SURFACE LIGHTING DEVICE

BACKGROUND OF THE INVENTION

1. Field of the Invention

The present invention relates to a surface lighting device and a liquid crystal display device including the surface lighting device, and in particular to the surface lighting device which realizes a surface light source by arranging LEDs (Light Emitting Diode), which are capable of emitting light of primary colors of red, green and blue, or LEDs, which emit light of two or more kinds of colors in a complementary color relation, and the liquid crystal display device which attains high luminance even on a large display area by including the surface lighting device.

2. Description of the Related Art

Examples of a backlight unit incorporated in a liquid crystal display device include a sidelight or direct type backlight unit using a cold cathode tube and a sidelight type backlight unit using an LED. However, the cold cathode tube has problems in that high voltage is required for an inverter and that mercury is contained and, to make matters worse, has a problem in that a color reproduction range is narrow.

Thus, it is the mainstream in recent years to use an LED as a light source. Conventional examples will be described below.

A display device 160 of a conventional example 1 shown in FIG. 23 is characterized by including: a diffusion plate 1; a light guide plate 18 which is set behind the diffusion plate 1; and a red light-emitting LED 7, a blue light-emitting LED 8 and a green light-emitting LED 9 which are arranged on the side of the light guide plate 18 and carry out lighting, and in that light from the light-emitting LEDs in the light guide plate 18 is mixed and the light is diffused on the diffusion plate 1, whereby surface lighting is realized (JP-A-2002-341797).

In addition, a liquid crystal display device 170 of a conventional example 2 shown in FIG. 24 is characterized by including: a liquid crystal display panel 13; a prism sheet 11 which is set behind the liquid crystal display panel 13; a first diffusion plate 14 which is set behind the prism sheet 11; a substrate 4 which is set behind the first diffusion plate 14 and is mounted with plural white LEDs 12; and a second diffusion plate 15 which is set behind the substrate 4 and is used for taking in extraneous light, and in that white light from the white LEDs is supplied and extraneous light is taken in to light the liquid crystal display panel two-dimensionally (JP-A-2002-311412).

Moreover, a liquid crystal display device 180 of a conventional example 3 shown in FIG. 25 is characterized by including: a liquid crystal display panel 13; a diffusion plate 1 which is arranged behind the liquid crystal display panel; a light guide plate 18 which is arranged behind the diffusion plate 1; a transparent plate 16 which is set behind the light guide plate 18; a substrate 4 which is set behind the transparent plate 16 and includes red light-emitting LEDs 7, blue light-emitting VFDs (vacuum fluorescent displays) 17, green light-emitting LEDs 9 and a reflection plate 2 which is arranged so as to be laid among the LEDs and the VFDs; and sidelights 20 which are arranged on the sides of the light guide plate 18, and in that the red light-emitting LEDs 7, the blue light-emitting VFDs 17 and the green light-emitting LEDs 9 can emit light independently for each single color and are lit almost simultaneously in a short time and in order for obtaining white light (JP-A-6-018882, JP-A-2002-258815). In addition, in the liquid crystal display device 180 of the conventional example 3, light from the LEDs is transmitted through the transparent plate 16 to be made incident on the light guide plate 18, mixed, and diffused on the diffusion plate 1, whereby surface lighting is supplied to the liquid crystal display panel 13. Further, the reflection plate 2 is useful for returning the light, which has returned from the diffusion plate 1 or the transparent plate 16, to the liquid crystal display panel 13 again, and increasing luminance of the surface lighting. Here, the reflection plate 2 is set so as to avoid a metal-embedded PCB 5, on which a circuit for driving light-emitting elements such as the red LED 7 or wiring for sending signals is disposed, as structural example 2 of an LED part and a reflection plate in the conventional example 3 shown in FIG. 26.

In the display device 160 of the conventional example 1, since LEDs are arranged at corners or sides of a light guide plate, there is a problem in that high luminance cannot be attained on a large display area.

In addition, in the liquid crystal display device 170 of the conventional example 2, white LEDs are used, but the white LEDs have a problem in that the range of color reproducibility is narrow, since the white is made by emitting blue color light from blue LCD to a yellow fluorescent material.

Moreover, in the surface lighting of the liquid crystal display 180 of the conventional example 3, since LEDs of different colors are used, there is a problem in that unevenness of colors and unevenness of luminance due to unbalance of amounts of light among the LEDs, which emit light of different colors, cannot be overcome easily.

SUMMARY OF THE INVENTION

In order to solve the above-mentioned problems, a surface lighting device in accordance with a first aspect of the present invention is characterized by at least including:

a surface light source in which linear light sources having light-emitting elements, which corresponds to respective colors among combinations of plural colors at least including three primary colors of light, arranged in series are arranged in a predetermined order;

a reflection plate which is laid so as to fill spaces among the light-emitting elements constituting the linear light sources;

a substrate on which the surface light source and the reflection plate are set; and a diffusion plate which is located above the surface light source and the reflection plate, and in that non-light-emitting portions of the light emitting elements are covered by the reflection plate.

In order to solve the above-mentioned problems, a surface lighting device in accordance with a second aspect of the present invention is characterized by at least including:

a surface light source in which linear light sources having light-emitting elements, which corresponds to respective colors among combinations of plural colors at least including three primary colors of light, arranged in series are arranged in a predetermined order;

a reflection plate which is laid so as to fill spaces among the light-emitting elements constituting the linear light sources;

a substrate which has linear projected portions arranged at a fixed interval and on which the surface light source and the reflection plate are set; and a diffusion plate which is located above the surface light source and the reflection plate, and in that the linear light sources are arranged on slopes or sides of the linear projected portions arranged at the fixed interval on the substrate, and an irradiation angle, at which an amount of light of the light-emitting elements corresponding to at least one color of the plural colors is maximized according to the interval of the linear projected portions and an interval between the diffusion plate and the substrate, is set according to an angle of the slopes or the sides of the linear projected portions.

In addition, in order to solve the above-mentioned problems, a surface lighting device in accordance with a third aspect of the present invention is characterized by at least including:

a surface light source in which linear light sources having light-emitting elements, which corresponds to respective colors among combinations of plural colors at least including three primary colors of light, arranged in series are arranged in a predetermined order and at a fixed interval;

light irradiation angle correcting means in light-emitting portions or on the light emitting portions of the light-emitting elements;

a reflection plate which is laid so as to fill spaces among the light-emitting elements constituting the linear light sources;

a substrate on which the linear light sources and the reflection plate are set; and a diffusion plate which is located above the linear light sources and the reflection plate, and in that an irradiation angle, at which an amount of light is maximized, is set by the light irradiation angle correcting means on the light-emitting portion of the linear light sources corresponding to at least one color among the plural colors according to the interval of the linear light sources and an interval between the diffusion plate and the substrate.

Further, in order to solve the above-mentioned problems, a surface lighting device in accordance with a fourth aspect of the present invention is characterized by at least including:

a surface light source in which light-emitting element groups having at least three light-emitting elements, which correspond to at least three primary colors of light, arranged to be contiguous with vertexes of a triangle are arranged in a matrix shape;

a substrate on which the light-emitting element groups are arranged; and a diffusion plate which is located above the surface light source, and in that the light-emitting element groups are arranged to be deviated every other column or row such that a positional relation among the light-emitting element groups is a delta shape, and a row interval, a column interval, and an arrangement angle of the light-emitting element groups are adjusted such that, when it is assumed that an average amount of light calculated from a sum of amounts of light of the single color light-emitting elements is 100%, a sum of amounts of light of the respective single color light-emitting elements at a center of gravity of the delta shape and a center of gravity of a diamond shape formed by two delta shapes is between 75% and 125%.

Moreover, in order to solve the above-mentioned problems, a liquid crystal display device in accordance with a fifth aspect of the present invention is characterized by at least including: one of the surface lighting devices according to the first to the fourth aspects of the present invention; and a liquid crystal display panel.

BRIEF DESCRIPTION OF THE DRAWINGS

In the accompanying drawings:

FIG. 4 is a diagram showing a surface lighting device in accordance with a second embodiment;

DESCRIPTION OF THE PREFERRED EMBODIMENTS

Figure 1:
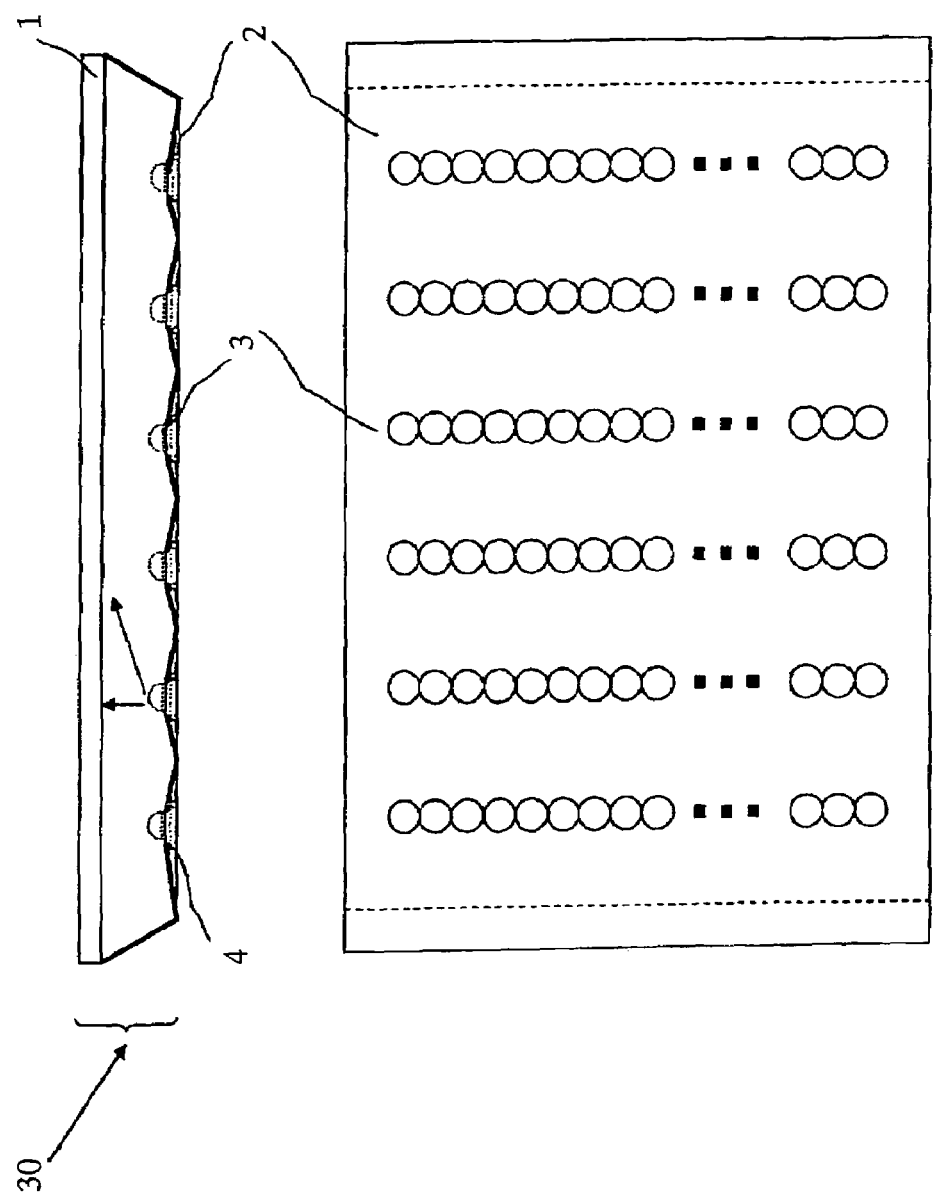
FIG. 1 is a diagram showing a direct type backlight unit structure of a surface illumination device in accordance with a first embodiment.

A surface lighting device 30 shown in FIG. 1 includes; linear light sources in which LED elements 3 are arranged continuously; a reflection plate 2 which fills spaces among the LED elements 3; a substrate 4 on which the LED elements 3 and the reflection plate 2 are set and which is made of a material such as an aluminum plate and also serves as a heat radiation plate; and a diffusion plate 1 which is located in an upper position and is transparent but diffuses light. Here, the reflection plate 2 which fills spaces among the LED elements 3 means the reflection plate 2 which is arranged on a metal-embedded PCB 5, on which non-light-emitting portions of the LED elements 3 and wiring or a circuit for driving the LED elements 3 are disposed, as shown in a sectional view and a plan view illustrating an example 1-1 of structures of an LED portion and a reflection plate in a first embodiment of FIG. 2. In addition, the reflection plate 2 which fills spaces among the LED elements 3 may be the reflection plate 2 having through-holes in which the light-emitting portions of the LED elements 3 fit are opened such that the reflection plate 2 covers portions other than the LED light-emitting portion as shown in a sectional view and a plan view illustrating an example 1-2 of structures of an LED portion and a reflection plate in the first embodiment of FIG. 3.

Figure 2:
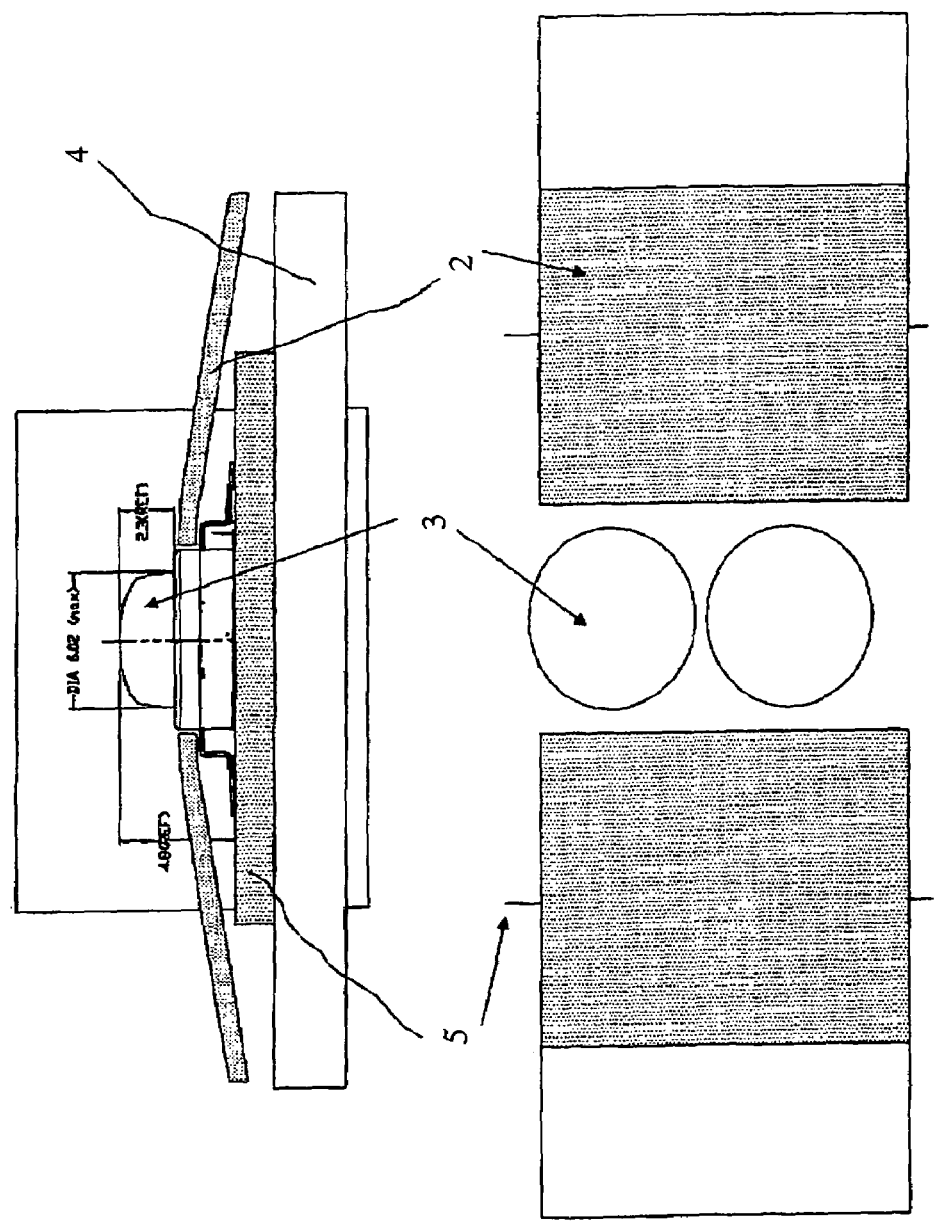
FIG. 2 is a diagram showing an example of structures 1-1 of an LED portion and a reflection plate in the first embodiment.
Figure 3:
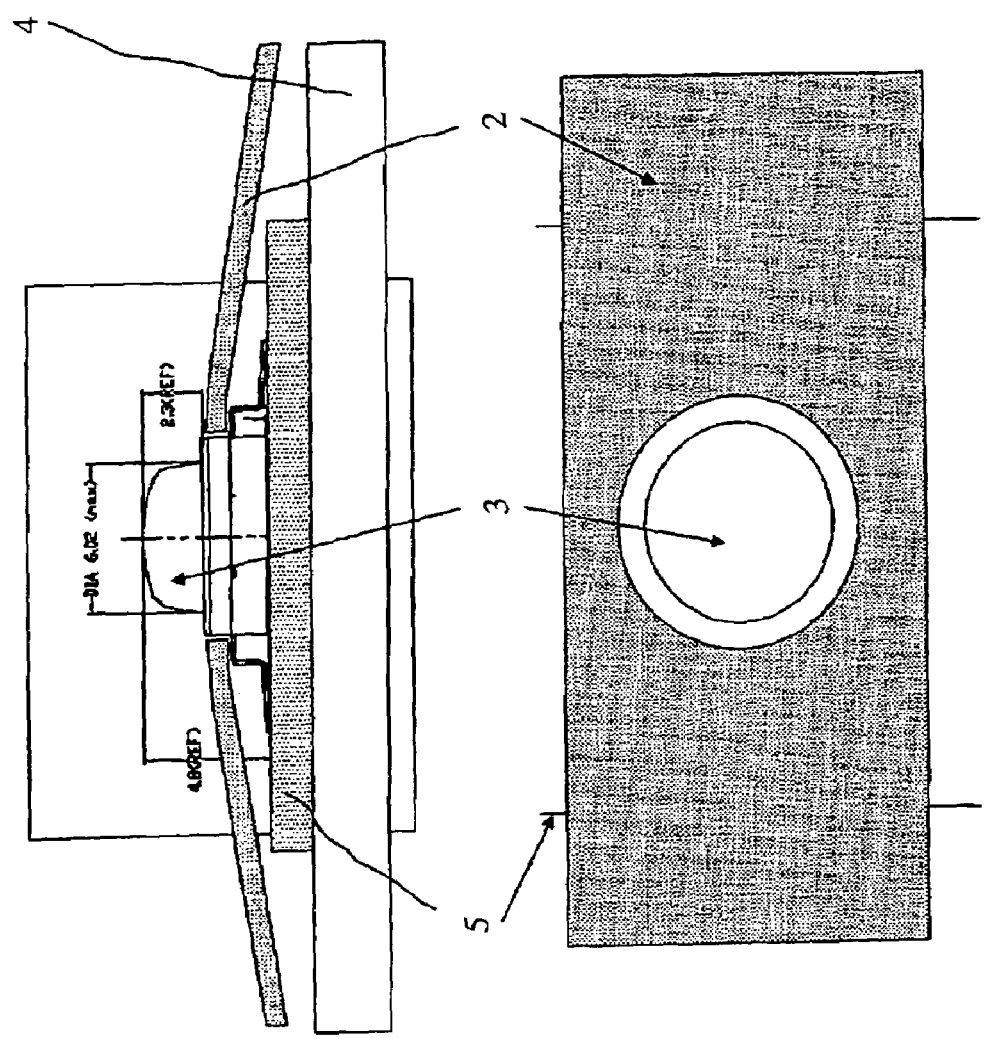
FIG. 3 is a diagram showing an example of the structures 1-2 of the LED portion and the reflection plate in the first embodiment.

By arranging the reflection plate 2 as shown in FIGS. 2 and 3, since a surface area cover rate of the reflection plate 2 can be increased to 94% or more as shown in Table 1, there is an effect that unevenness of luminance can be improved significantly.

TABLE 1

|  | rate of a reflection plate covering a surface area (to area of base) | light use efficiency (amount of light transmitted through a diffusion plate/amount of emitted light) |
| --- | --- | --- |
| structure 2 (conventional structure) | 80% | 47% |
| structure 1-1 | 85%–95% | 61% |
| structure 1-2 | 95% or more | 87% |

Here, concerning an example 2 of structures of an LED portion and a reflection plate in a conventional example 3, an example 1-1 (FIG. 2) of structures of an LED portion and a reflection plate in a first embodiment and an example 1-2 (FIG. 3) of structures of an LED portion and a reflection plate in the first embodiment, a rate of a reflection plate covering a substrate surface is calculated, and light use efficiency, which is a ratio of an amount of light transmitted through a diffusion plate and an amount of emitted light, is also calculated, and results of the calculation are arranged in table 1 such that the results can be compared. Note that, in calculating the surface cover rate and the light use efficiency, the calculation was performed with conditions that a diameter of a lens of an LED element was 6 mm, a width of a reflection plate was 24 mm, a line pitch of liner light sources consisting of LED elements was 120 mm, and a gain of the reflection plate was 0.8. In addition, as a material of the reflection plate, an aluminum plate, white polyester (foamed and mixed with a diffusion material), and silver vapor deposition polyester are possible. However, in the calculation of the light use efficiency, it was assumed that white polyester was used.

A surface lighting device 40 shown in FIG. 4 includes: linear light sources in which LED elements 3 having prisms 6 adhered to light-emitting surfaces thereof are arranged continuously; the reflection plate 2 which fills spaces among the LED elements 3; the substrate 4 on which the LED elements 3 and the reflection plate 2 are set and which is made of a material such as an aluminum plate and also serves as a heat radiation plate; and the diffusion plate 1 which is located in an upper position and is transparent but diffuses light. Here, in FIG. 4, the reflection plate 2 which fills spaces among the LED elements 3 simply means the reflection plate 2 which fills the spaces among the LED elements 3 as in the conventional example. However, the reflection plate 2 which fills spaces among the LED elements 3 may be the reflection plate 2 which fills spaces among LED elements as shown in FIGS. 2 and 3.

Figure 5A:
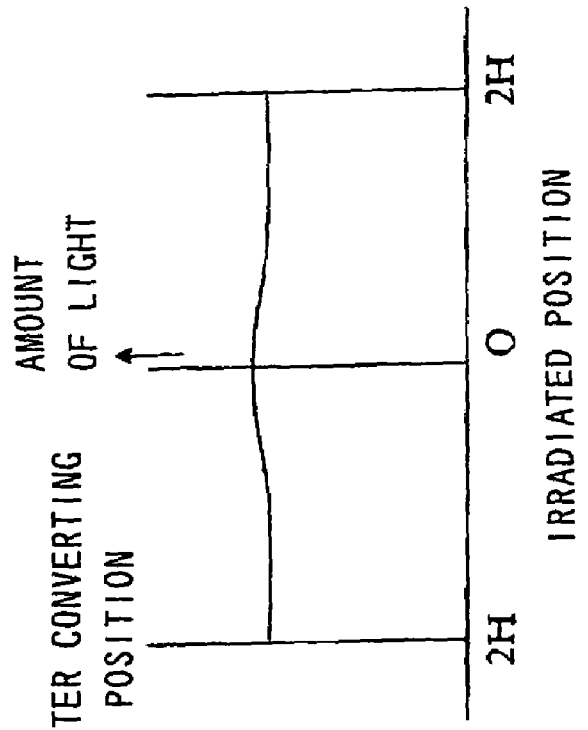
FIG. 5A is a diagram showing a relation between an irradiation angle and an amount of light of an LED element in the case in which an irradiation angle indicating a peak amount of light is 45 degrees or more.
Figure 5B:
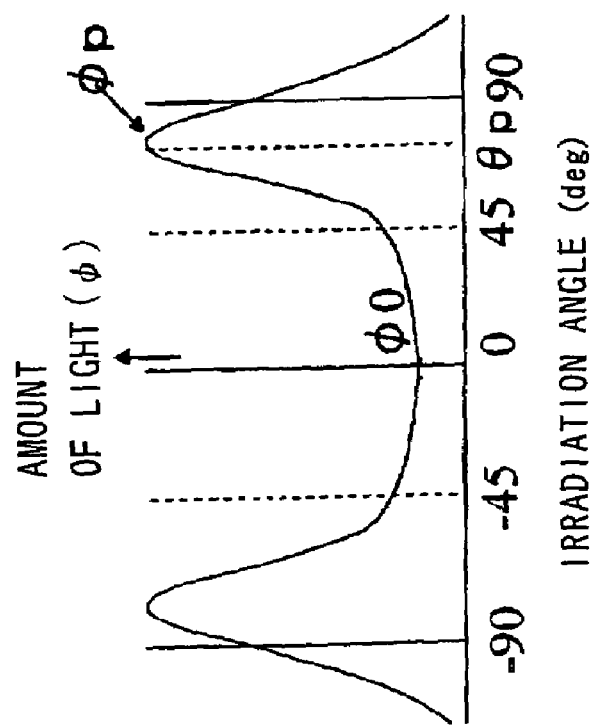
FIG. 5B is a diagram showing a relation between a position to be irradiated and an amount of light in the case in which an irradiation angle indicating a peak amount of light is 45 degrees or more.
Figure 6:
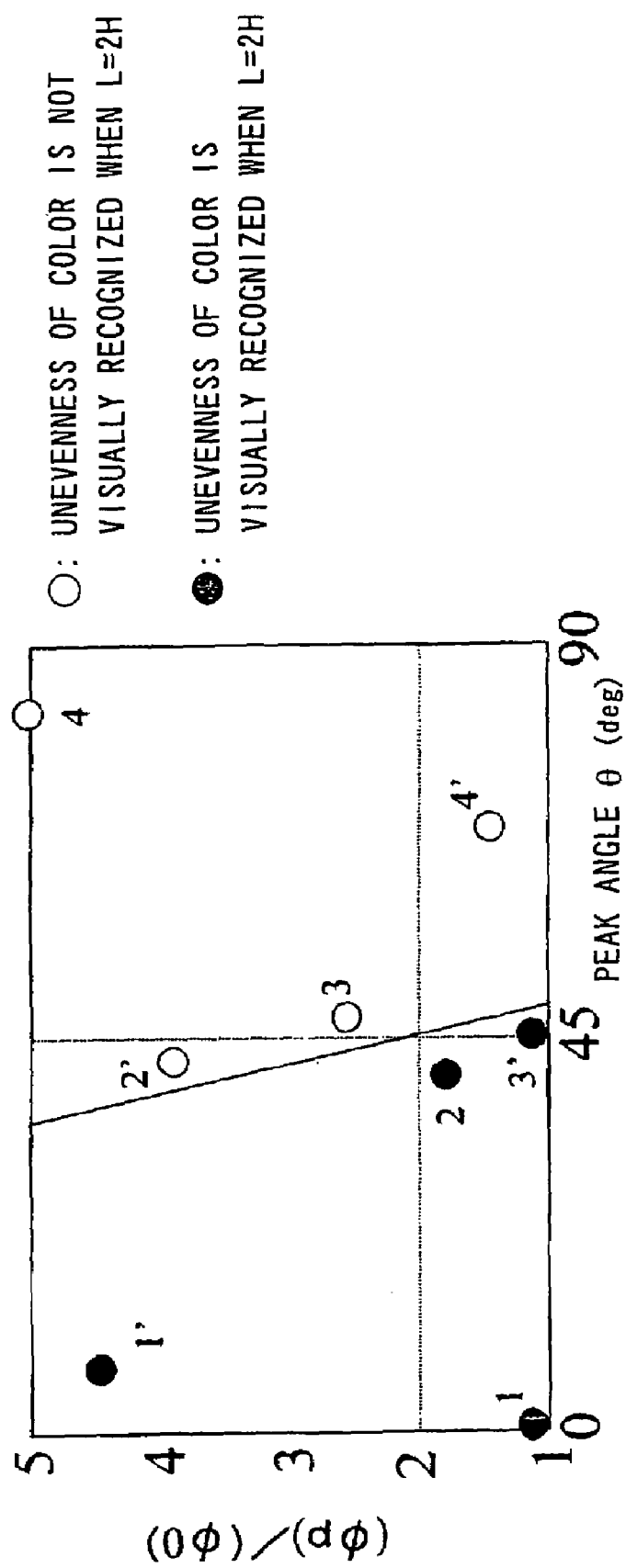
FIG. 6 is a diagram showing a relation among a peak amount of light irradiation angle, irradiation intensity, and visibility.

By adhering the prism 6 on the light-emitting surface of the LED element 3, it becomes possible to arbitrarily set an irradiation angle at a peak amount of light of the respective LED elements 3. In addition, mirrors or diffusers can be used in the same way as prisms 6. Therefore, a light emission pattern with a light emission peak angle at 45 degrees or more as shown in FIG. 5A can be realized. There is an effect that a fixed amount of light can be obtained regardless of a light source position according to overlapping of light from plural linear light sources as shown in FIG. 5B. Consequently, an effect can be obtained in that unevenness of color is not visually recognized even by a visual recognition test for unevenness of color as shown in FIG. 6. Here, in FIGS. 5A and 5B, θp indicates an irradiation angle at which an amount of light of an LED element is maximized, φ0 indicates an amount of light at an irradiation angle 0 degree, and φp indicates a peak amount of light. In addition, FIG. 5A shows a relation between an irradiation angle and an amount of light of an LED element, and FIG. 5B shows an amount of light immediately below a diffusion plate in a range of +2H to −2H with a light source as a start point assuming that a distance from the substrate 4 to the diffusion plate 1 is H. On the other hand, in FIG. 6, the horizontal axis indicates a peak light amount angle of an LED element, and the vertical angle indicates a value found by dividing a peak amount of light of the LED element by an amount of light at an irradiation angle 0. In FIG. 6, concerning surface light sources, which are constituted by LED elements with treatment such as translucent treatment applied to a lens or a prism of a light-emitting portion thereof to adjust the amount of light and the peak light amount irradiation angle, surface light sources in which unevenness of color is not visually recognized are indicated by a white circle, and surface light sources in which unevenness of color is visually recognized are indicated by a black circle, and the surface light sources are represented together with optical characteristics thereof.

Incidentally, in FIG. 4, an irradiation angle, at which luminance of the LED element 3 is maximized, is adjusted by providing the prism 6 on the LED element 3. However, the irradiation angle may be adjusted by other light irradiation angle adjusting means. For example, means such as deformation of the light-emitting surface of the LED element 3, a change of an attachment angle of a light-emitting element, and the like may be adopted. In addition, the light irradiation angle adjusting means is not required to be on the LED element 3 but may be in the LED element 3.

Figure 7:
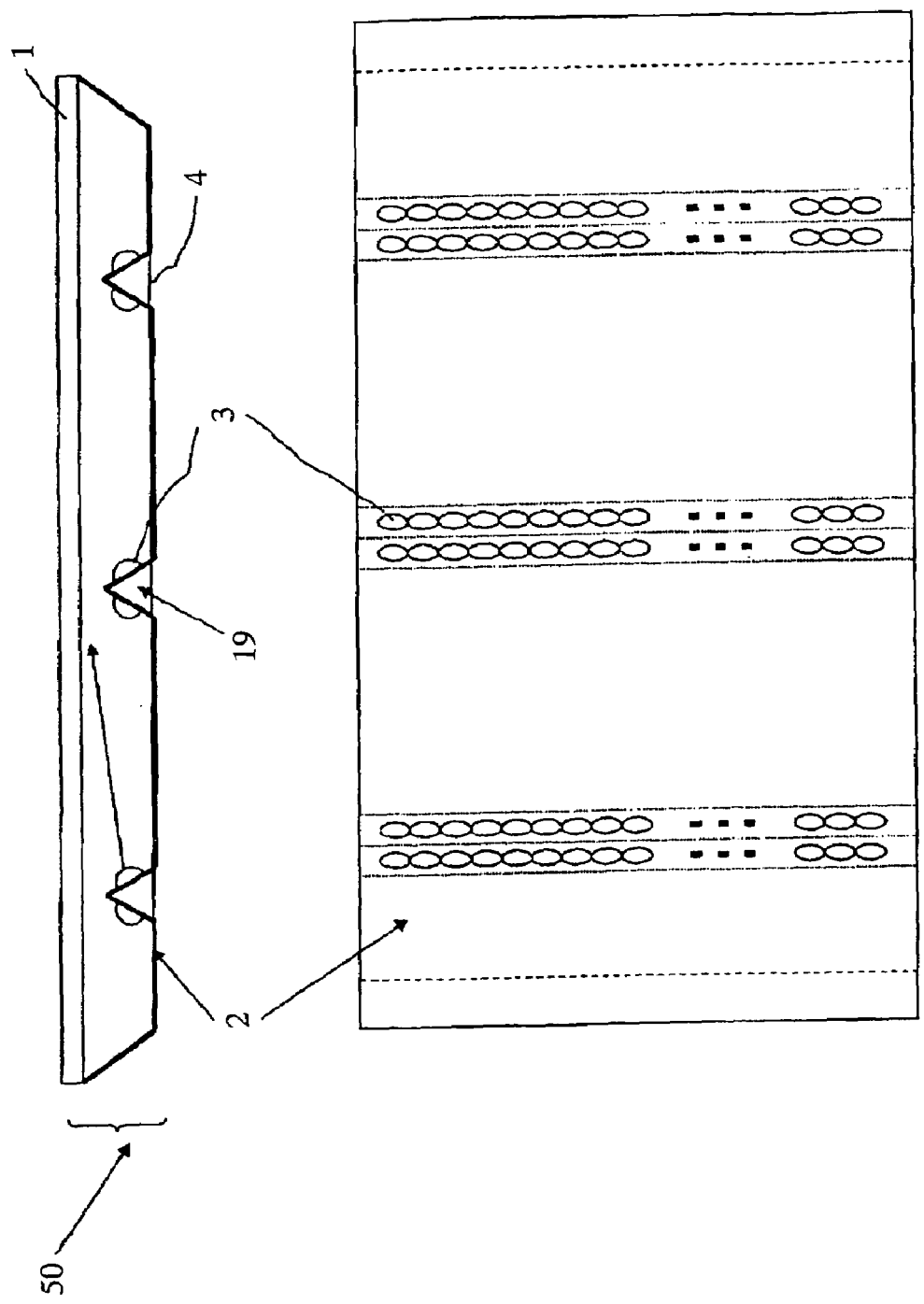
FIG. 7 is a diagram showing a surface lighting device in accordance with a third embodiment of the present invention.

A surface lighting device 50 shown in FIG. 7 is characterized by including; linear light sources in which the LED elements 3 are arranged continuously; the reflection plate 2 which fills spaces among the LED elements 3; the substrate 4 on which the LED elements 3 and the reflection plate 2 are set and which is made of a material such as an aluminum plate and also serves as a heat radiation plate; a heat sink 19 which transmits heat from the LED elements 3 to the heat radiation plate; and the diffusion plate 1 which is located in an upper position and is transparent but diffuses light, and in that the linear light sources are arranged on a slope with linear projected portions protruding from the substrate 4. Here, the "reflection plate 2 which fills spaces among the LED elements 3" means the reflection plate 2 which is arranged as shown in FIGS. 2 and 3, but may be the reflection plate 2 which is arranged as shown in FIG. 4.

By setting the LED elements 3 on the slope, in the case in which the LED elements 3, which are continuously arranged on both sides of the slope, are considered as linear light sources, it becomes possible to set an irradiation angle at a peak amount of light to an arbitrary angle. Therefore, a light emission pattern with a light emission peak angle at 45 degrees or more as shown in FIG. 5A can be realized. According to a visual recognition test for unevenness of color as shown in FIG. 6, there is an effect that, visual recognition of unevenness of color can be reduced.

Figure 8:
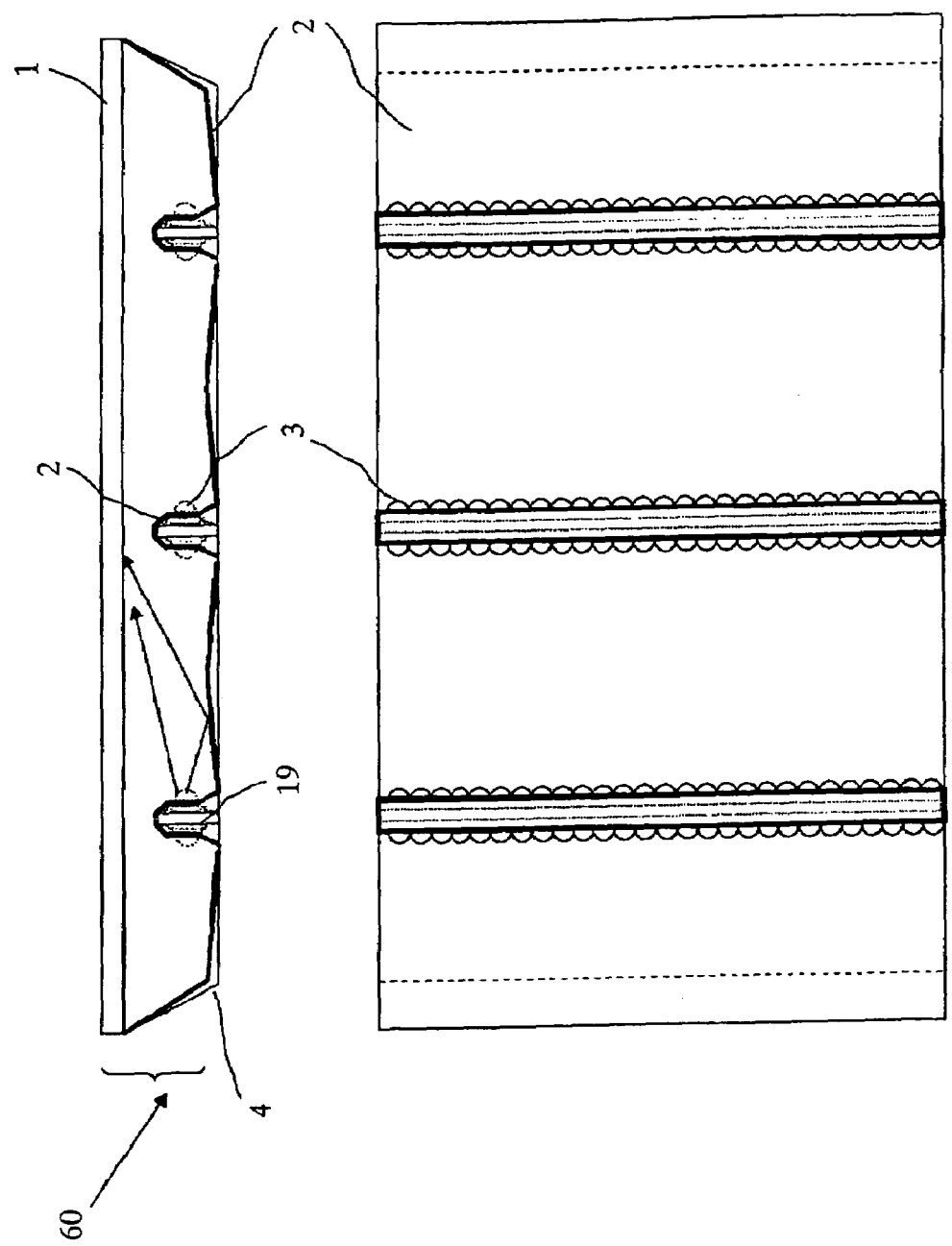
FIG. 8 is a diagram showing a surface lighting device in accordance with a fourth embodiment of the present invention.

A surface lighting device 60 shown in FIG. 8 includes; linear light sources in which the LED elements 3 are arranged continuously; a heat sink 19 which transmits heat from the LED elements 3 to a heat radiation plate; the reflection plate 2 which fills spaces among the linear light sources; the substrate 4 on which the LED elements 3 and the reflection plate 2 are set and which is made of a material such as an aluminum plate and also serves as a heat radiation plate; and the diffusion plate 1 which is located in an upper position and is transparent but diffuses light, and the linear light sources are arranged on both sides of a vertical plate protruding from the substrate 4. Here, the "reflection plate 2 which fills spaces among the linear light sources" means the reflection plate 2 which is arranged as shown in FIGS. 2 and 3, but may be the reflection plate 2 which is arranged as shown in FIG. 4.

By setting the LED elements 3 both the sides of the vertical plate continuously, in the case in which the continuously arranged LED elements 3 are considered as linear light sources, the same state as setting the irradiation angle at the peak amount of light to 90 degrees is realized as shown in FIG. 8. Therefore, according to a visual recognition test for unevenness of color as shown in FIG. 6, there is a further effect that visual recognition of unevenness of color can be reduced. In FIG. 6. the term "L" represents the pitch between light emitting sources and the term "H" represents the distance between the light emitting sources and an optical plate (such as shown in FIG. 10).

Figure 10:
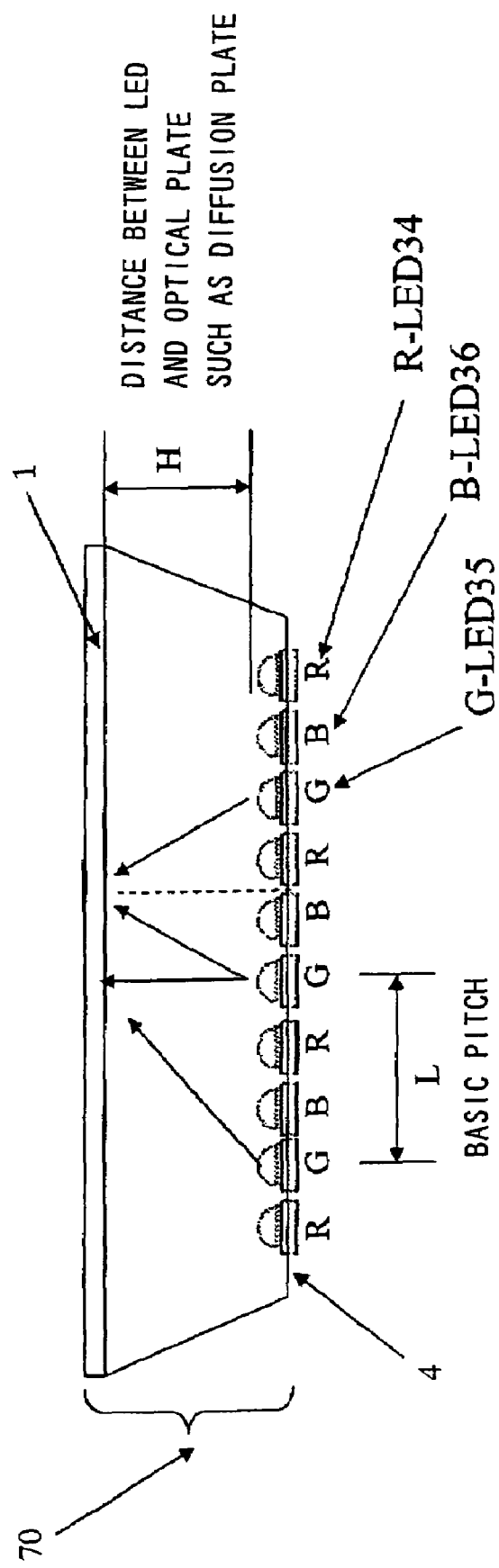
FIG. 10 is a diagram showing a surface lighting device in accordance with a fifth embodiment of the present invention.

A surface lighting device 70 shown in FIG. 10 is characterized by including; green linear light sources G-LED35 in which green LED elements having the prisms 6 adhered to light-emitting surfaces thereof are arranged continuously; blue linear light sources B-LED36 in which blue LED elements having the prisms 6 (such as in FIG. 4) adhered to light-emitting surfaces thereof are arranged continuously; red linear light sources R-LED34 in which red LED elements having the prisms 6 adhered to light-emitting surfaces thereof are arranged continuously; the reflection plate 2 not illustrated in the figure which fills spaces among the linear light source; the substrate 4 on which the LED elements of the respective colors and the reflection plate 2 are set and which is made of a material such as an aluminum plate and also serves as a heat radiation plate; and the diffusion plate 1 which is located in an upper position and is transparent but diffuses light, and in that the prisms 6 are adhered to the light-emitting surfaces of the LED elements of the respective primary colors to make it possible to change maximum light-emitting angles of the LED elements of the respective colors. In addition, as shown in FIG. 10, the surface lighting device is characterized in that, when a height from the substrate 4 to the diffusion plate 1 is H, and a period of repetition of a set of linear light-emitting sources, which consists of the red linear light source R-LED34 indicated by sign R, the blue linear light source B-LED36 indicated by sign B, and the green linear light source G-LED35 indicated by sign G, is L, the following expression is satisfied.

$$L \leq 2H \times \tan \text{ (maximum light-emitting angle of an LED element)} \quad \text{expression 1}$$

Figure 9B:
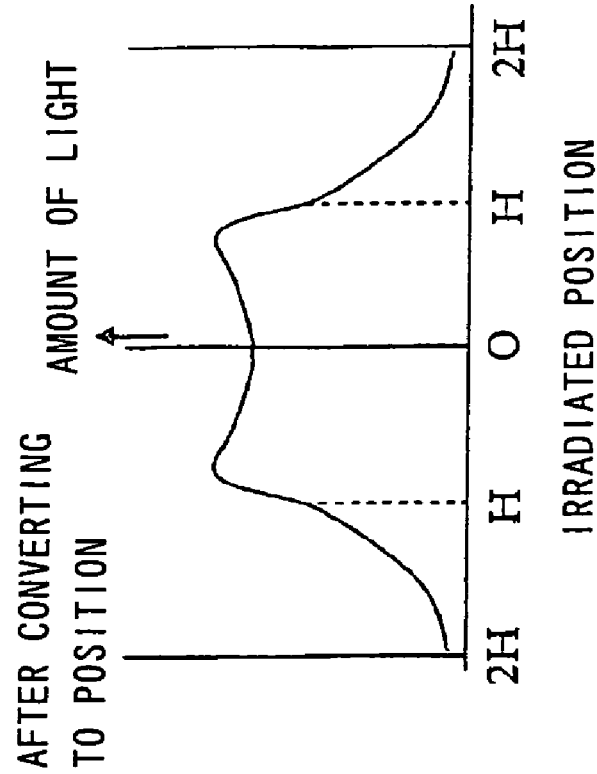
FIG. 9B is a diagram showing a relation between a position to be irradiated and an amount of light in the case in which an irradiation angle indicating a peak amount of light is less than 45 degrees.
Figure 9A:
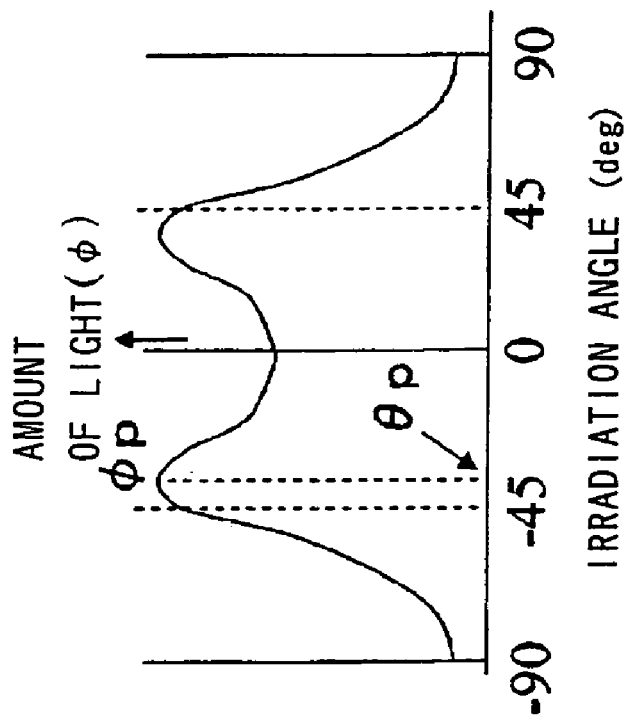
FIG. 9A is a diagram showing a relation between an irradiation angle and an amount of light of an LED element in the case in which an irradiation angle indicating a peak amount of light is less than 45 degrees.

According to the surface lighting device of FIG. 10, even in the case in which the maximum light-emitting angle cannot be set to 45 degrees or more as shown in FIG. 9A, and a fixed amount of light cannot be obtained immediately below the diffusion plate 1 when the interval H between the diffusion plate 1 and the substrate 4 is H=(½)×L as shown in FIG. 9B, since the interval between the diffusion plate 1 and the substrate 4 is set as shown in expression 1, there is an effect that a fixed amount of light can be obtained immediately below the diffusion plate 1 and unevenness of color can be reduced. Here, θp indicates an irradiation angle at which an amount of light of an LED element is maximized, φ0 indicates an amount of light at an irradiation angle 0, and φp indicates a peak amount of light. In addition, FIG. 9A shows a relation between an irradiation angle and an amount of light of an LED element, FIG. 9B shows an amount of light immediately below a diffusion plate in a range of +2H to −2H horizontally with a light source as a start point assuming that a height from the substrate 4 to the diffusion plate 1 is H.

Incidentally, in the surface lighting device shown in FIG. 10, an irradiation angle, at which luminance of the LED elements of the respective colors is maximized, is adjusted by providing the prisms 6 on the LED elements of the respective colors. However, the irradiation angle may be adjusted by other light irradiation angle adjusting means. For example, means such as deformation of the light-emitting surfaces of the LED elements of the respective colors, a change of an attachment angle of a light-emitting element, and the like may be adopted. In addition, the light irradiation angle adjusting means is not required to be on the LED elements of the respective colors, but may be in the LED elements of the respective colors. Note that, although red, blue and green are selected as a combination of plural colors, the same effect is realized even if cyan, magenta, yellow and the like, which are intermediate colors, are further added.

Figure 11:
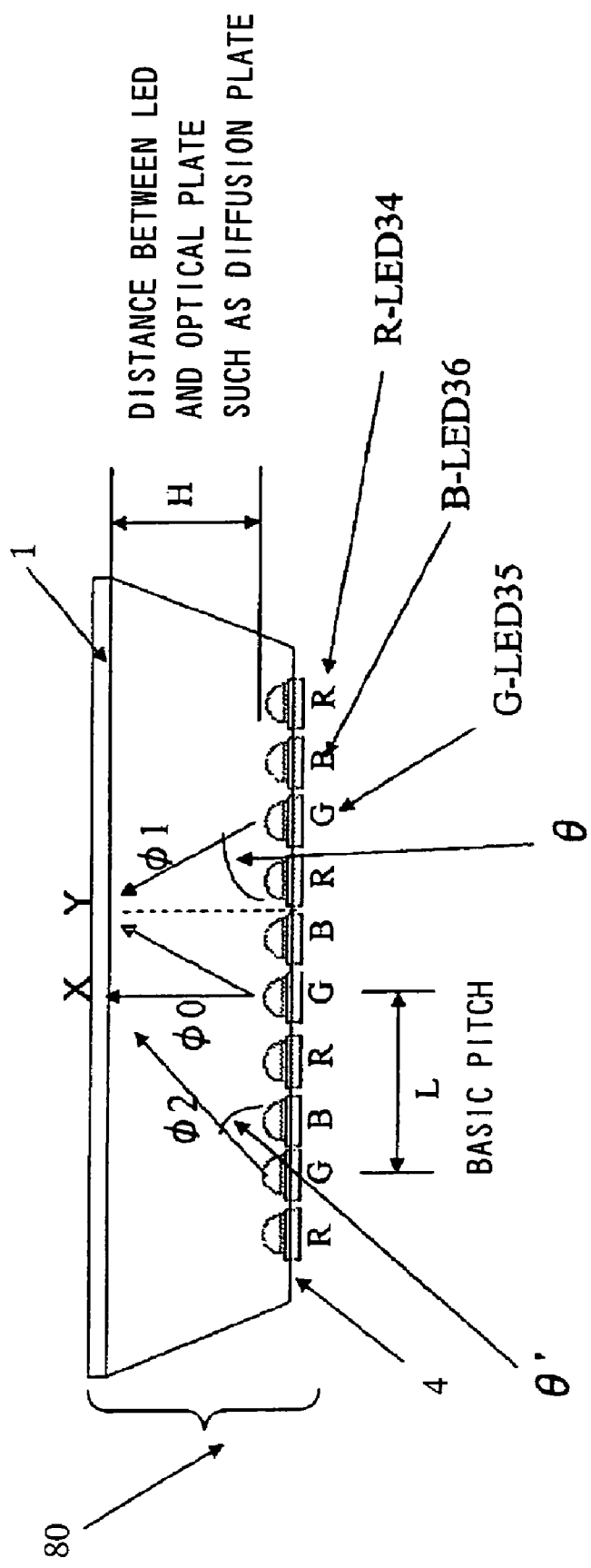
FIG. 11 is a diagram showing a surface lighting device in accordance with a sixth embodiment of the present invention.

A surface lighting device 80 shown in FIG. 11 is characterized by including; green linear light sources G-LED35 in which green LED elements having the prisms 6 adhered to light-emitting surfaces thereof are arranged continuously; blue linear light sources B-LED36 in which blue LED elements having the prisms 6 (such as in FIG. 4) adhered to light-emitting surfaces thereof are arranged continuously; red linear light sources R-LED34 in which red LED elements having the prisms 6 adhered to light-emitting surfaces thereof are arranged continuously; the reflection plate 2 not illustrated in the figure which fills spaces among the linear light source; the substrate 4 on which the LED elements and the reflection plate 2 are set and which is made of a material such as an aluminum plate and also serves as a heat radiation plate; and the diffusion plate 1 which is located in an upper position and is transparent but diffuses light, and in that the prisms 6 are adhered to the light-emitting surfaces of the LED elements of the respective primary colors to make it possible to change maximum light-emitting angles of the LED elements of the respective colors. In addition, as shown in FIG. 10, the surface lighting device 70 is characterized in that, when a height from the substrate 4 to the diffusion plate 1 is H, and a period of repetition of a set of linear light-emitting sources, which consists of the red linear light source R-LED34 indicated by sing R, the blue linear light source B-LED36 indicated by sign B, and the green linear light source G-LED35 indicated by sign G, is L, the height H and the period L are adjusted to put an amount of light in the surface within a range of 80% to 125% in the case in which an average amount of light in the surface is assumed to be 100%.

Therefore, according to the surface lighting device shown 80 in FIG. 11, in the case in which, for example, it is assumed that $\phi 0$ is an amount of light at an irradiation angle 0, $\phi 2$ is an amount of light at an irradiation angle $\theta$, and $\phi 1$ is an amount of light at an irradiation angle $\theta'$, an amount of light immediately above the green linear light sources G-LED35 is represented as ($\phi 0 + 2 \times \phi 2 \times \cos 3\theta$). There is an effect that fluctuation of an amount of light in the surface represented by an amount of light immediately above the center of two columns of the green linear light sources G-LED35 ($2 \times \phi 1 \times \cos 3\theta'$) can be reduced, a substantially fixed amount of light can be obtained immediately below the diffusion plate 1, and unevenness of color can be reduced. Note that, although red, blue and green are selected as a combination of plural colors, the same effect is realized even if cyan, magenta, yellow and the like, which are intermediate colors, are further added.

Figure 12:
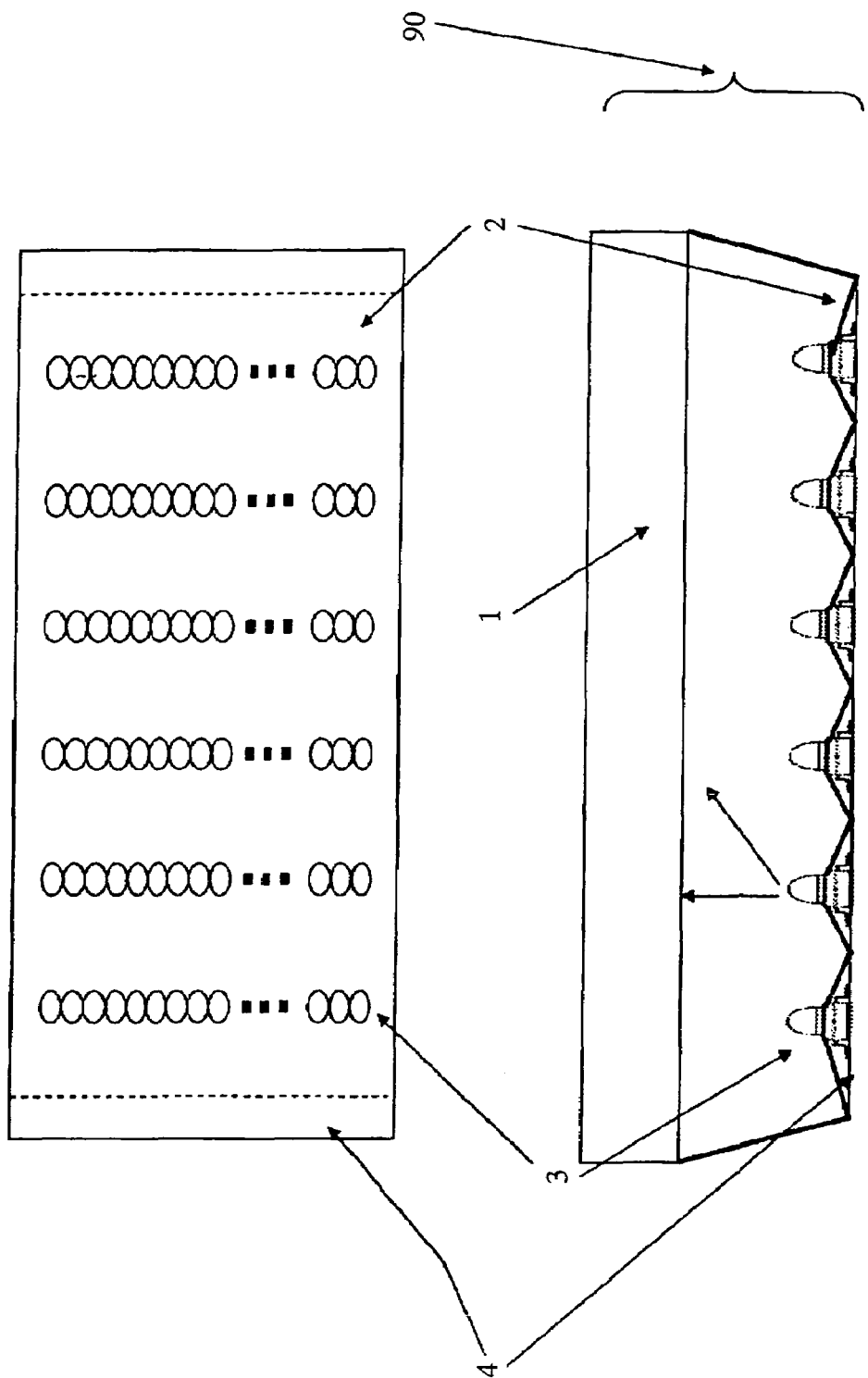
FIG. 12 is a diagram showing a surface lighting device in accordance with a seventh embodiment of the present invention.

A surface lighting device 90 shown in FIG. 12 includes; linear light sources in which the LED elements 3 are arranged continuously; the reflection plate 2 shown in the figure which fills spaces among the linear light sources; the substrate 4 on which the LED elements 3 and the reflection plate 2 are set and which is made of a material such as an aluminum plate and also serves as a heat radiation plate; and the diffusion plate 1 which is located in an upper position and is transparent but diffuses light. Here, the diffusion plate 1 is a diffusion plate formed of a transparent acrylic resin plate provided with recesses and protrusions for scattering light on a surface thereof or a diffusion plate formed of transparent acrylic resin with particles for scattering light contained therein and formed in a plate shape. Thus, the diffusion plate constituting the surface lighting device shown in FIG. 11 is characterized in that a gain is limited to about 1.5 to 0.8 by adjusting a degree of recessed and protrusions on the surface, a size of the scattering particles and a thickness of the diffusion plate. Note that, the gain of the diffusion plate is a value represented by the following expression if it is assumed that transmitted light of vertical luminance of B candela is obtained when incident light of L lux is vertically irradiated on the diffusion plate.

$$\text{Gain} = \pi \times (B/L)$$

Figure 13:
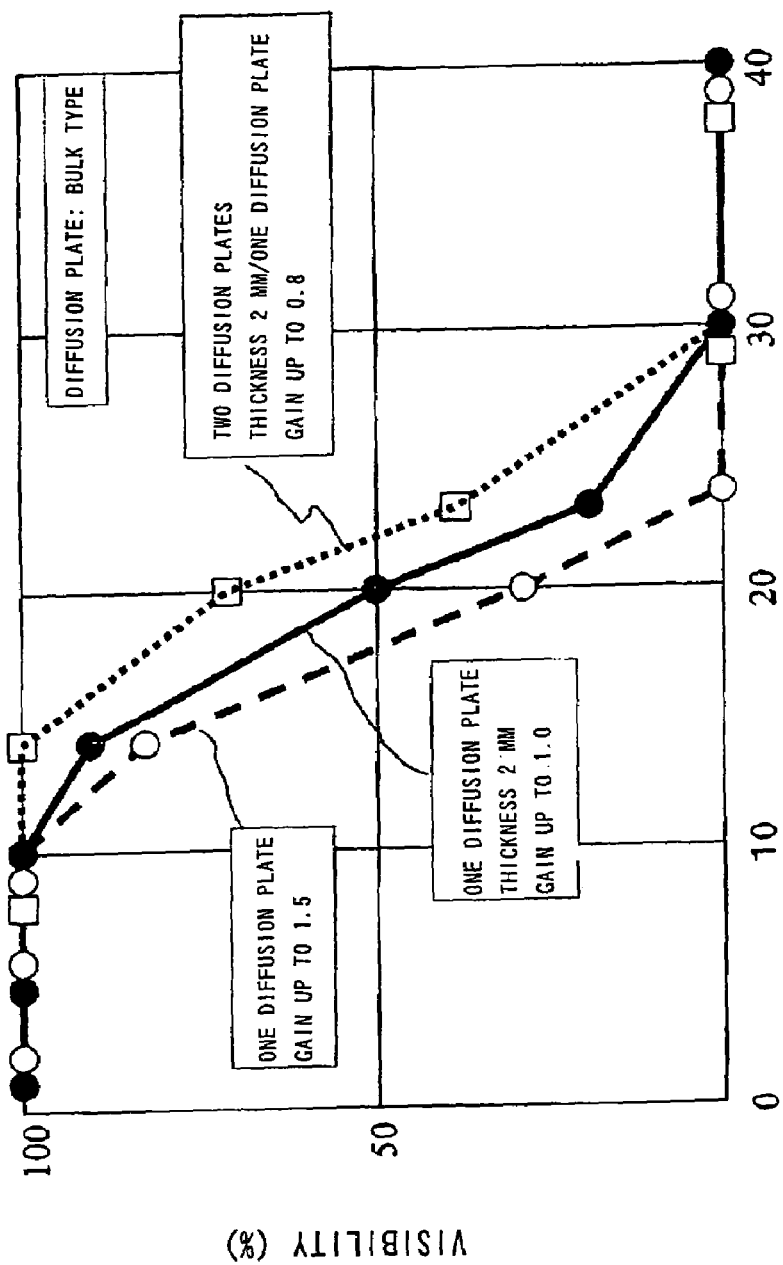
FIG. 13 is a diagram showing a relation between fluctuation in an amount of light and visibility on a lower surface of a diffusion plate.

According to the above-mentioned surface lighting device, since scattering of light from the respective linear light sources is performed moderately, mixture of light from the adjacent linear light sources of different colors is performed without unevenness. Therefore, as shown in FIG. 13, since scattering of light is larger as the gain indicates a lower value, there is an effect that visibility is improved even if fluctuation in an amount of light immediately below the diffusion plate due to the linear light sources is large. Here, FIG. 13 shows a result of conducting a research on visibility with respect to diffusion plates of different types with a fluctuation range of an amount of light in the surface of a single color on a lower surface of a diffusion plate (a range of fluctuation in an amount of light in the surface in the case in which an average amount of light in the surface is assumed to be 100%) plotted on the horizontal axis and visibility (a ratio of persons who are not disturbed by unevenness of color among ten subjects) plotted on the vertical axis. In addition, in the figure, white circles and long broken lines indicate visibility with respect to a diffusion plate with a gain of about 1.5, black circles and solid lines indicate visibility with respect to a diffusion plate with a gain of about 1.0, and squares and short broken lines indicate visibility with respect to a diffusion plate with a gain of about 0.8. The figure indicates that the diffusion plate with a smaller gain secures higher visibility even if the fluctuation range of an amount of light in the surface is large.

Figure 14:
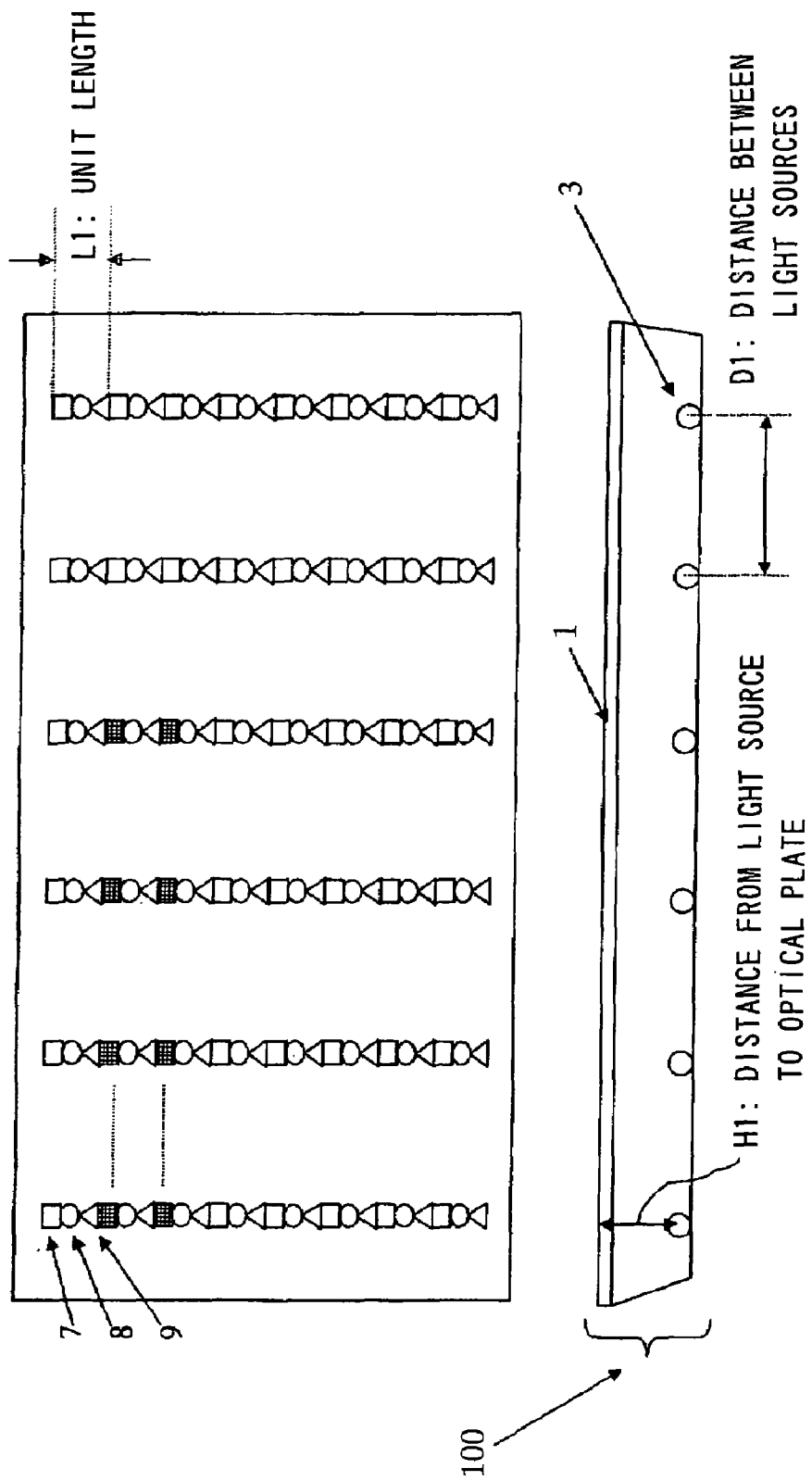
FIG. 14 is a diagram showing a surface lighting device in accordance with an eighth embodiment of the present invention.

A surface lighting device 100 shown in FIG. 14 is characterized by including; linear light sources in which red light-emitting LEDs 7, blue light-emitting LEDs 8, and green light-emitting LEDs 9 are linearly arranged in a unit length L1 as groups, and the plural groups are further arranged linearly at an interval L1; the reflection plate 2 not shown in the figure which fills spaces among the linear light sources; the substrate on which the LED elements 3 and the reflection plate are set and which is made of a material such as an aluminum plate and also serves as a heat radiation plate; and the diffusion plate 1 which is located in an upper position and is transparent but diffuses light. In addition, the surface lighting device 100 is characterized in that an arrangement order of the light-emitting LEDs of the respective primary colors is fixed in all the linear light-emitting sources, the linear light sources are arranged at an interval of D1 to form a surface light source, the LEDs of the same primary color form a square, and a height from the linear light sources to the diffusion plate 1 is H1.

According to the surface lighting device 100 shown in FIG. 14, since the LEDs of the same primary color are arranged so as to form a square, there is an effect that a range of fluctuation in an amount of light in the surface can be reduced and white light without unevenness of color can be obtained by composition of light of respective primary colors. Note that, although red, blue and green are selected as a combination of plural colors, the same effect is realized even if cyan, magenta, yellow and the like, which are intermediate colors, are further added.

Figure 15:
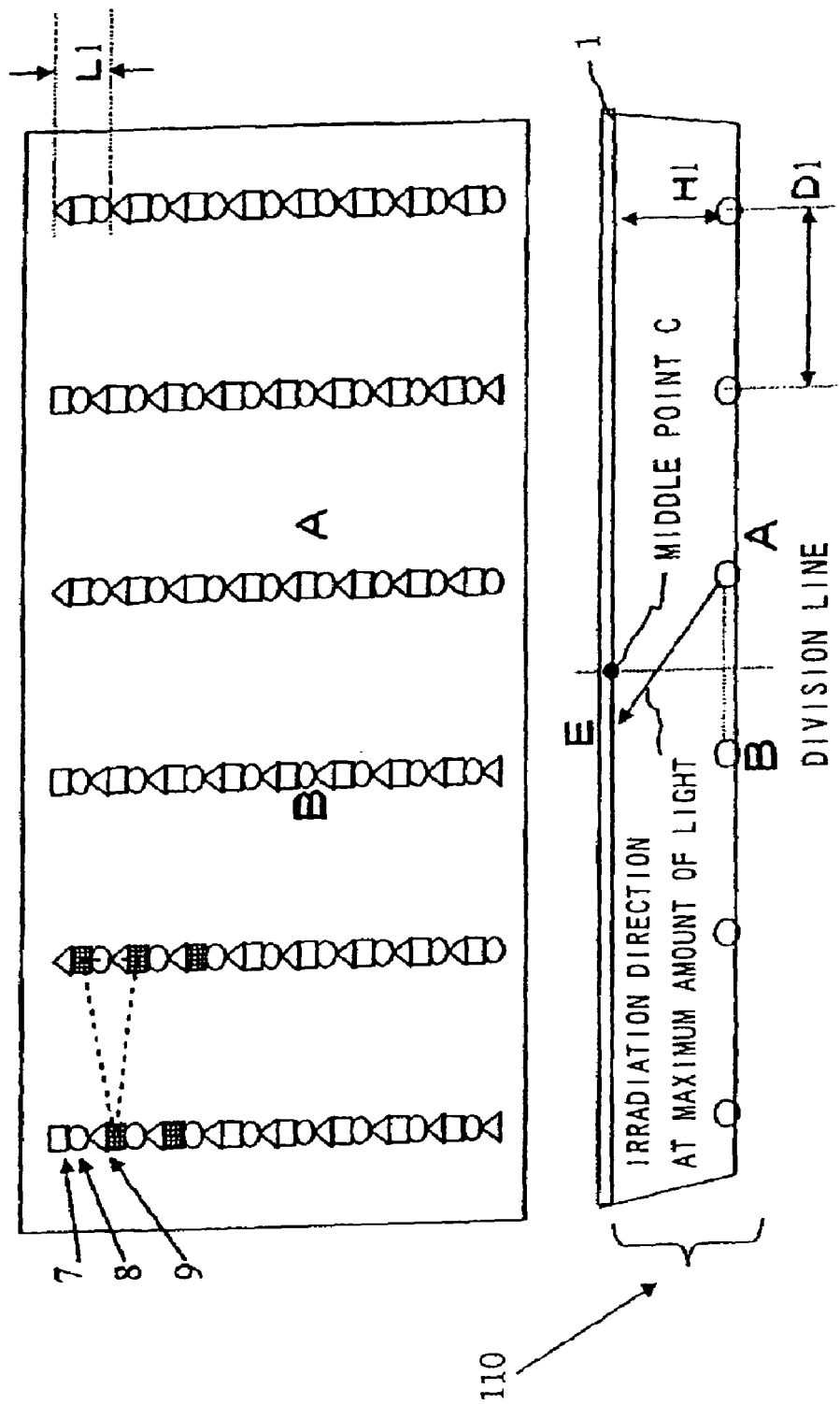
FIG. 15 is a diagram showing a surface lighting device in accordance with a ninth embodiment of the present invention.

A surface lighting device 110 shown in FIG. 15 is characterized by including; linear light sources in which red light-emitting LEDs 7, blue light-emitting LEDs 8, and green light-emitting LEDs 9 are linearly arranged in a unit length L1 as groups, and the plural groups are further arranged linearly at an interval L1; the reflection plate 2 not shown in the figure which fills spaces among the linear light sources; the substrate 4 on which the LED elements 3 and the reflection plate 2 are set and which is made of a material such as an aluminum plate and also serves as a heat radiation plate; and the diffusion plate 1 which is located in an upper position and is transparent but diffuses light. In addition, the surface lighting device 110 is characterized in that linear light sources, in which groups of light-emitting LEDs of primary colors arranged in an order of red, green and blue are arranged linearly, and linear light sources, in which groups of light-emitting LEDs of primary colors arranged in an order of red, green and blue are arranged linearly, are arranged alternately at an interval D1 to form a surface light source, the LEDs of the same primary color form a triangle, and a height from the linear light sources to the diffusion plate 1 is H1. Moreover, the surface lighting device 110 is characterized in that, in linear light sources A and B adjacent to each other, when a center point C is defined as shown in FIG. 15, the height H1, the interval D1, and an irradiation direction at a maximum amount of light of LED elements are adjusted such that a position E, where an extension of an irradiation direction at a maximum amount of light of LEDs constituting an arbitrary linear light source reaches the diffusion plate 1, goes beyond the center point C.

Figure 16:
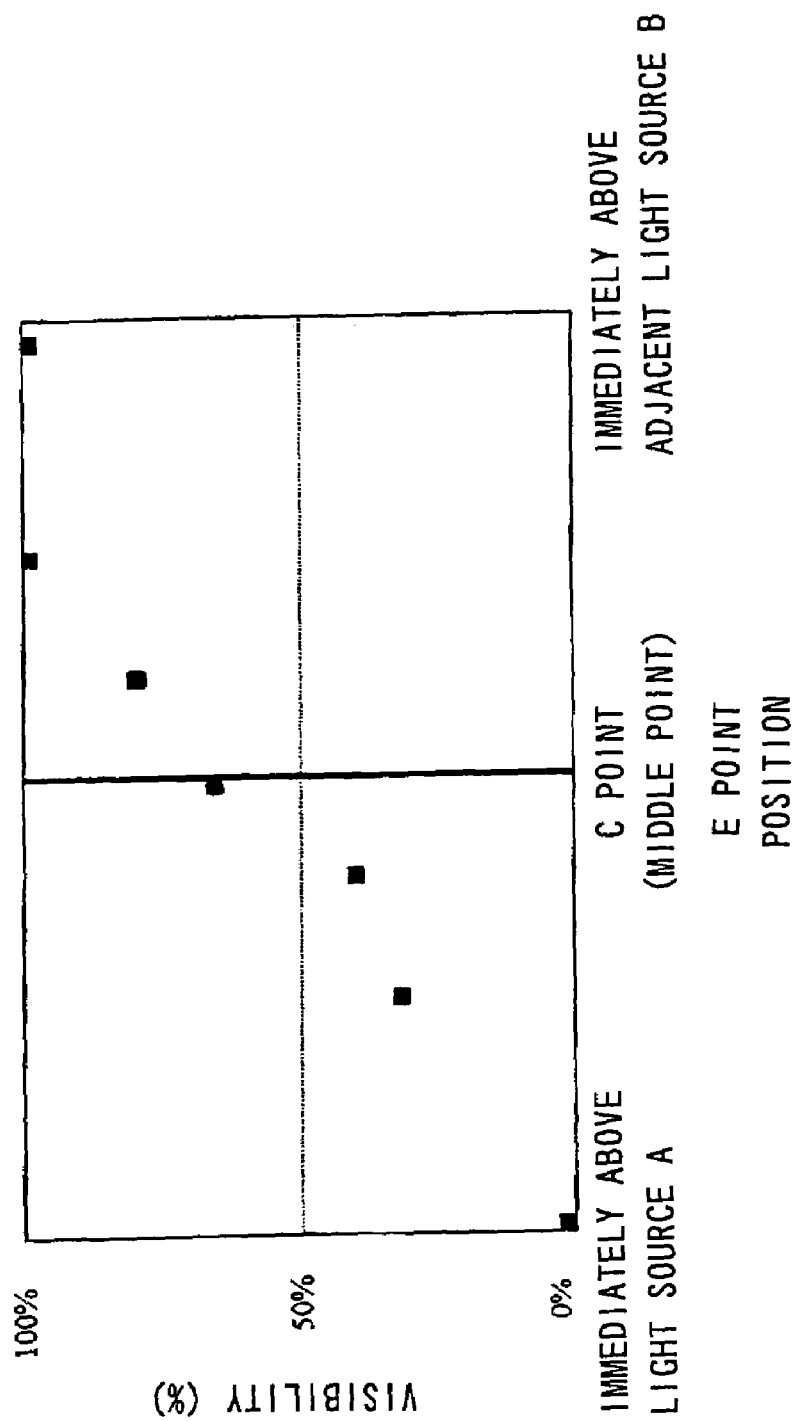
FIG. 16 is a diagram showing a relation between an E point position and visibility.

According to the surface lighting device 110 shown in FIG. 15, since the LEDs of the same primary color form a triangle, there is an effect that a range of fluctuation in an amount of light in the surface of a single color can be reduced, and unevenness of luminance can be reduced. In addition, in linear light sources A and B adjacent to each other, when a center point C is defined as shown in FIG. 15, the height H1, the interval D1, and an irradiation direction at a maximum amount of light of LED elements are adjusted such that a position E, where an extension of an irradiation direction at a maximum amount of light of LEDs constituting an arbitrary linear light source reaches the diffusion plate 1, goes beyond the center point C, whereby there is also an effect that a range of fluctuation in an amount of light in the surface of a single color can be reduced, and visibility is improved as the position E is closer to a position immediately above the adjacent light source B as shown in FIG. 16. Here, in FIG. 16, the vertical axis indicates visibility and the horizontal axis indicates a position of the E point. FIG. 16 shows visibility in the case in which an irradiation angle at a maximum amount of light of LEDs in the linear light source A is adjusted such that the E point moves from the linear light source A of attention to a position immediately above the adjacent linear light source B. Note that, although red, blue and green are selected as a combination of plural colors to be white by mixing of light, colors in a complementary color relation maybe selected. For example, the same effect can be realized by a combination of yellow and blue.

Figure 17:
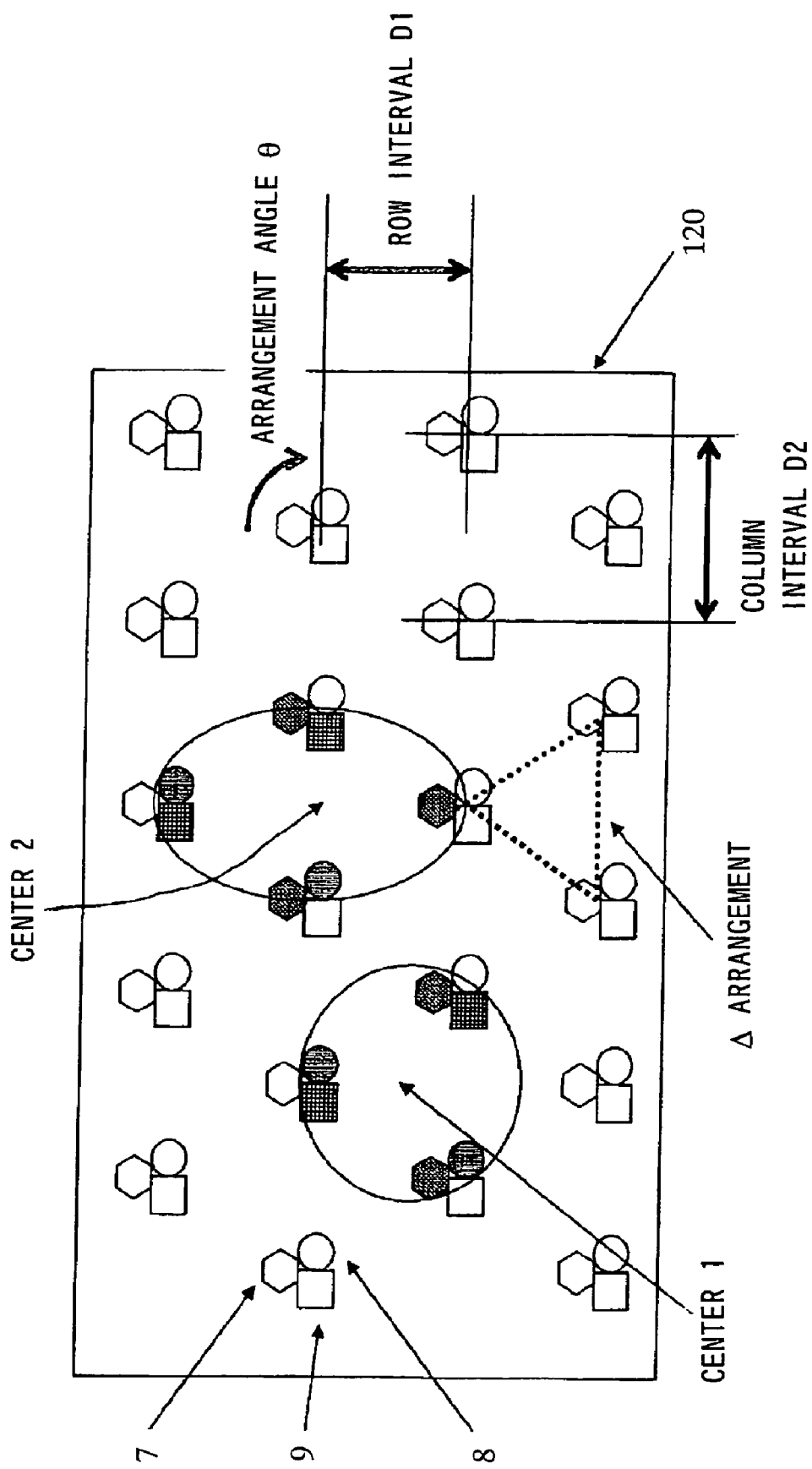
FIG. 17 is a diagram showing an arrangement of light-emitting elements in a surface lighting device in accordance with a tenth embodiment of the present invention.

FIG. 17 shows an arrangement of light-emitting element groups in a surface lighting device 120. The surface lighting device 120 is characterized by including; a surface light source constituted by arranging the red light-emitting LEDs 7, the blue light-emitting LEDs 8, and the green light-emitting LEDs 9 to be contiguous with each other in a shape of delta groups (hereinafter referred to as "Δ groups") and further arranging the Δ groups in a delta shape (hereinafter referred to as "Δ arrangement"); the reflection plate not shown in the figure which fills spaces among the light-emitting LEDs of the respective primary colors constituting the surface light source; the substrate on which the LED elements and the reflection plate are set and which is made of a material such as an aluminum plate and also serves as a heat radiation plate; and the diffusion plate which is located in an upper position and is transparent but diffuses light. In addition, the surface lighting device 120 is characterized in that, by adjusting the row interval D1, the column interval D2, and the arrangement angle θ of the Δ groups, when sums of amounts of light of the LEDs of the respective primary colors are compared in a center 1 and a center 2 of a blank area in which the light-emitting LED elements of the primary colors are not arranged, in the case in which an average value of sums of amount is assumed to be 100%, the sum of amounts of light is in a range between 75% and 125%. Here, the center 1 means a center of gravity of three LED Δ groups in the Δ arrangement, and the center 2 means a center of gravity of four LED Δ groups in a diamond arrangement consisting of two Δ arrangements. Incidentally, in the case in which attention is paid to two LED Δ groups which face each other when the LED Δ groups are in the Δ arrangement, it is desirable that the LED Δ groups are arranged such that light-emitting elements of different colors face each other. This is because the characteristic concerning the sum of amounts of light can be easily attained.

Note that, in arranging the LED Δ groups such that the sum of amounts of light of the LEDs of the respective primary colors is within the range of 75% to 125%, it is assumed that there is almost no fluctuation in an amount of light among LED elements of a single primary color and fluctuation in an amount of light among LED elements of primary colors. However, even if there is such fluctuation, by further adding means such as selection of LED elements and adjustment of electric current applied to LED elements, the fluctuation in an amount of light among LED elements of a single primary color and the fluctuation in an amount of light among LED elements of primary colors can be eliminated almost completely.

According to the surface lighting device shown in FIG. 17, since LEDs of the respective primary colors are arranged to be contiguous with each other in a shape of Δ groups, and the Δ groups are arranged in a Δ shape, there is an effect that LED elements can be arranged in the surface without deviation and, in the case in which attention is paid to single primary colors, a uniform amount of light can be obtained in the surface, and unevenness of luminance can be reduced.

Moreover, in one part in the center of the Δ arrangement in which LED elements are not arranged, when sums of amounts of light of LEDs of the respective primary colors placed at vertexes of the Δ arrangement, that is, a sum of amounts of light of the red LEDs, a sum of amounts of light of the blue LEDs, and a sum of amounts of light of the green LEDs are compared, in the case in which an average value of amount of light is assumed to be 100%, the LED Δ groups are arranged such that the sum of amounts of light of the LEDs of the respective primary colors is within the range of 75% to 125% by adjusting a row interval D1, a column interval D2, and an arrangement angle θ. Thus, there is an effect that unevenness of color in the case in which light is mixed can be reduced. In addition, in two parts in the center of the diamond arrangement in which LED elements are not arranged, the LED Δ groups are also arranged such that the sum of amounts of light of the LEDs of the respective primary colors is within the range of 75% to 125% by the same operation as that for the one part in the center. Thus, there is an effect that unevenness of color in the case in which light is mixed can be further reduced. Note that, although red, blue and green are selected as a combination of plural colors to be white by mixing of light, colors in a complementary color relation may be selected. For example, the same effect can be realized by a combination of yellow and blue.

Figure 18:
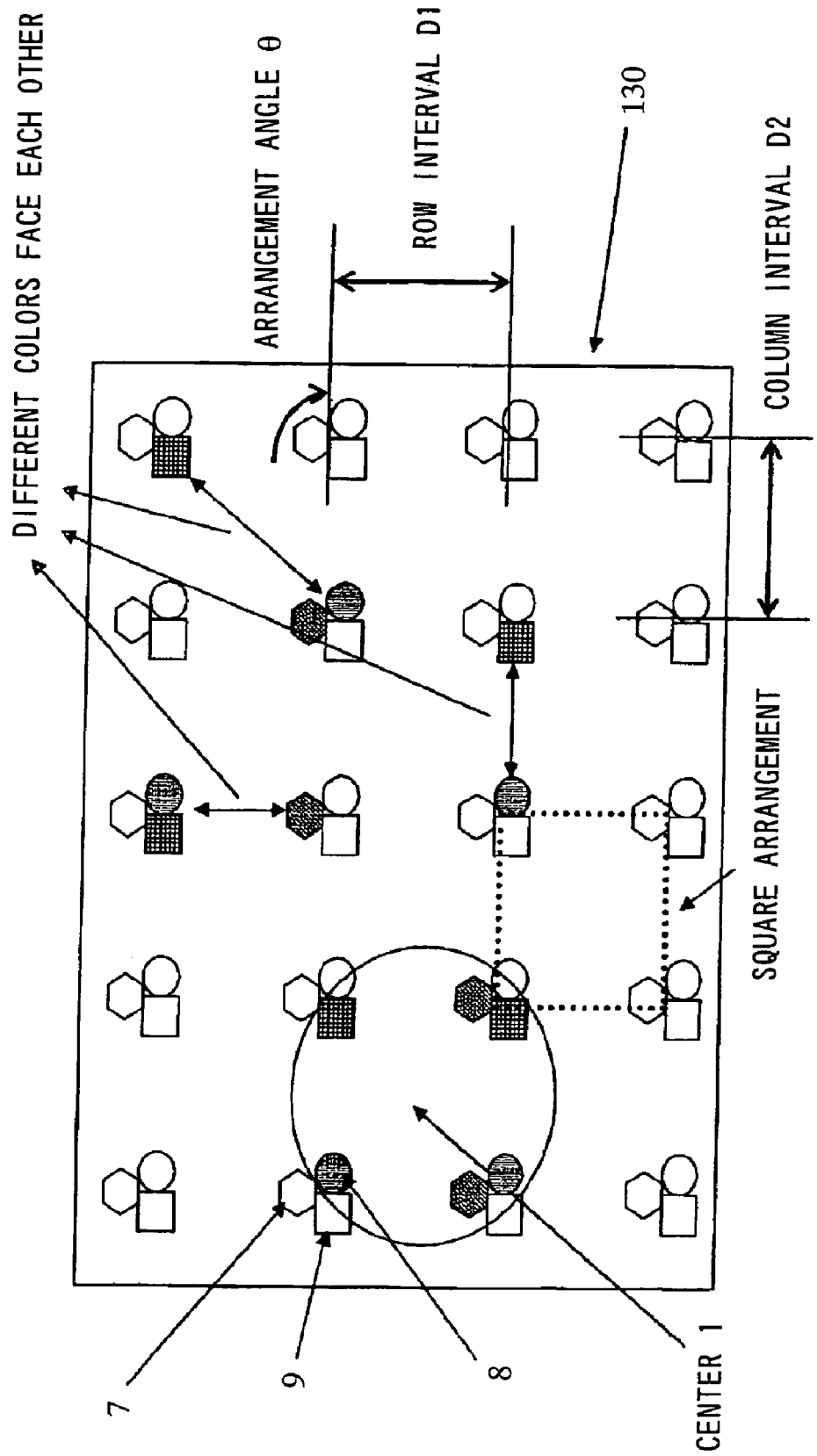
FIG. 18 is a diagram showing an arrangement of light-emitting elements in a surface lighting device in accordance with an eleventh embodiment of the present invention.

FIG. 18 shows an arrangement of light-emitting element groups in a surface lighting device 130. The surface lighting device 130 characterized by including; a surface light source constituted by arranging the red light-emitting LEDs 7, the blue light-emitting LEDs 8, and the green light-emitting LEDs 9 to be contiguous with each other in a shape of delta groups (hereinafter referred to as "Δ groups") and further arranging the plural Δ groups in a square shape (hereinafter referred to as "square arrangement"); the reflection plate not shown in the figure which fills spaces among the light-emitting LEDs of the respective primary colors constituting the surface light source; the substrate on which the LED elements and the reflection plate are set and which is made of a material such as an aluminum plate and also serves as a heat radiation plate; and the diffusion plate which is located in an upper position and is transparent but diffuses light. In addition, the surface lighting device 130 is characterized in that, by adjusting the row interval D1, the column interval D2, and the arrangement angle θ among the Δ groups, when sums of amounts of light of the LEDs of the respective primary colors are compared in a center 1 of a blank area in which the light-emitting LED elements of the primary colors are not arranged, the sum of amounts of light is in a range between 75% and 125%. Here, the center 1 means a center of gravity of four LED Δ groups in the square arrangement. Incidentally, in the case in which attention is paid to two LED Δ groups which face each other when the LED Δ groups are arranged in a square, it is desirable to arrange the LED Δ groups such that light-emitting elements of different colors face each other. This is because the characteristics concerning the sum of amounts of light can be easily attained.

Note that, in arranging the LED Δ groups such that the sum of amounts of light of the LEDs of the respective primary colors is within the range of 75% to 125%, it is assumed that there is almost no fluctuation in an amount of light among LED elements of a single primary color and fluctuation in an amount of light among LED elements of primary colors. However, even if there is such fluctuation, by further adding means such as selection of LED elements and adjustment of electric current applied to LED elements, the fluctuation in an amount of light among LED elements of a single primary color and the fluctuation in an amount of light among LED elements of primary colors can be eliminated almost completely.

According to the surface lighting device shown in FIG. 18, since LEDs of the respective primary colors are arranged to be contiguous with each other in a shape of Δ groups, and the Δ groups are arranged in a square shape, there is an effect that LED elements can be arranged in the surface without deviation and, in the case in which attention is paid to single primary colors, a uniform amount of light can be obtained in the surface, and unevenness of luminance can be reduced.

Moreover, in one part in the center of the square arrangement in which LED elements are not arranged, when sums of amounts of light of LEDs of the respective primary colors placed at vertexes of the square arrangement, that is, a sum of amounts of light of the red LEDs, a sum of amounts of light of the blue LEDs, and a sum of amounts of light of the green LEDs are compared, in the case in which an average value of sums of amount is assumed to be 100%, the LED Δ groups are arranged such that the sum of amounts of light of the LEDs of the respective primary colors is within the range of 75% to 125% by adjusting the row interval D1, the column interval D2, and the arrangement angle θ. Thus, there is an effect that unevenness of color in the case in which light is mixed can be reduced. Note that, although red, blue and green are selected as a combination of plural colors, the same effect can be realized by further adding cyan, magenta, yellow and the like, which are intermediate colors.

Figure 19:
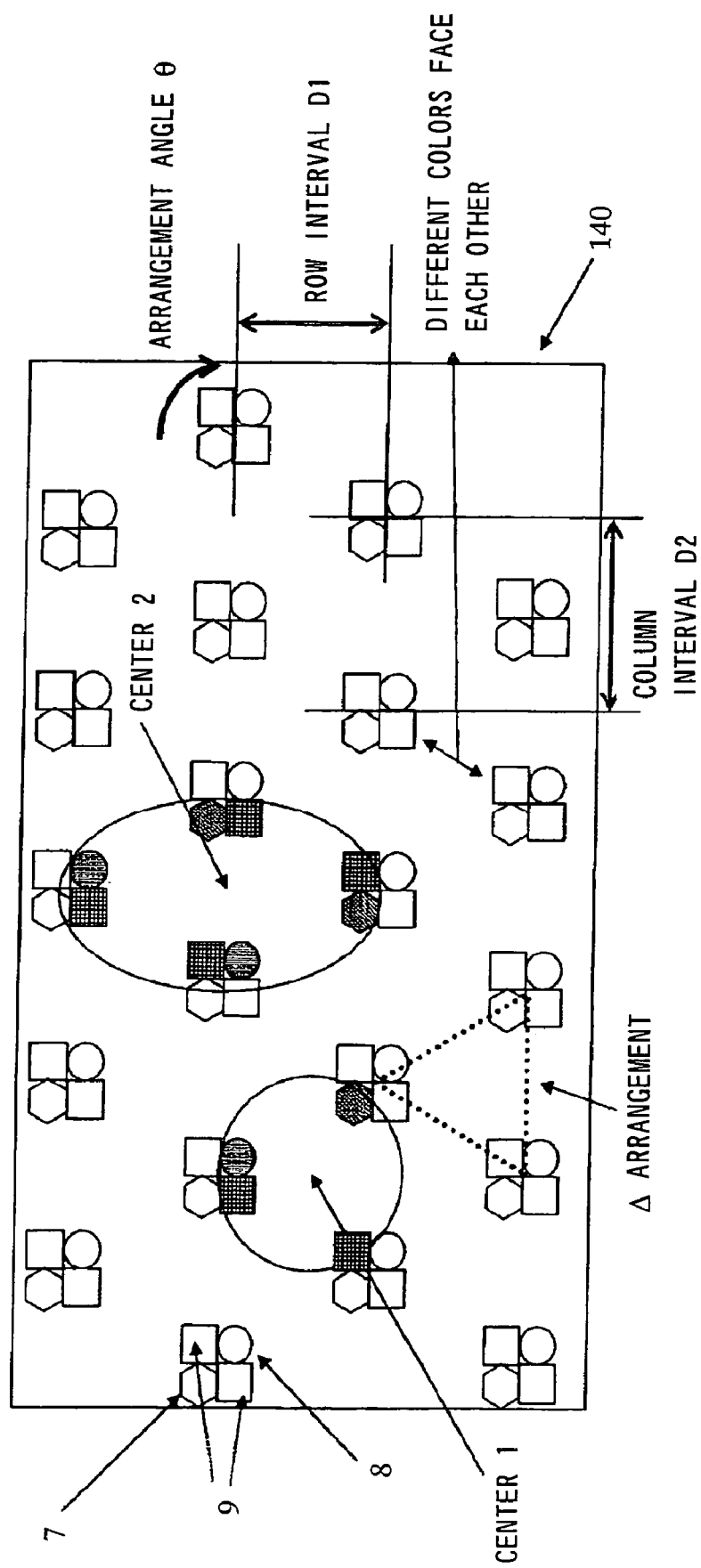
FIG. 19 is a diagram showing an arrangement of light-emitting elements in a surface lighting device in accordance with a twelfth embodiment of the present invention.

FIG. 19 shows an arrangement of light-emitting element groups in a surface lighting device 140. The surface lighting device 140 is characterized by including; a surface light source constituted by arranging four LED elements, which are constituted by the red light-emitting LEDs 7, the blue light-emitting LEDs 8, and the green light-emitting LEDs 9, to be contiguous with each other in a shape of groups of a square shape (hereinafter referred to as "square shape groups") and further arranging the square shape groups in a delta shape (hereinafter referred to as "Δ arrangement"); the reflection plate not shown in the figure which fills spaces among the light-emitting LEDs of the respective primary colors constituting the surface light source; the substrate on which the LED elements 3 and the reflection plate are set and which is made of a material such as an aluminum plate and also serves as a heat radiation plate; and the diffusion plate which is located in an upper position and is transparent but diffuses light. In addition, the surface lighting device 140 is characterized in that, by adjusting the row interval D1, the column interval D2, and the arrangement angle θ among the Δ groups, when sums of amounts of light of the LEDs of the respective primary colors are compared in a center 1 and a center 2 of a blank area in which the light-emitting LED elements of the primary colors are not arranged, in the case in which an average value of sums of amounts amount of light is assumed to be 100%, the sum of amounts of light is in a range between 75% and 125%. Here, the center 1 means a center of gravity of three LED square shape groups in the Δ arrangement, and the center 2 means a center of gravity of four LED square shape groups in a diamond arrangement consisting of two Δ arrangements. Incidentally, in the case in which attention is paid to two LED Δ groups which face each other when the LED Δ groups are in the Δ arrangement, it is desirable that the LED Δ groups are arranged such that light-emitting elements of different colors face each other. This is because the characteristic concerning the sum of amounts of light can be easily attained.

Note that, in arranging the LED square shape groups such that the sum of amounts of light of the LEDs of the respective primary colors is within the range of 75% to 125%, it is assumed that there is almost no fluctuation in an amount of light among LED elements of a single primary color and fluctuation in an amount of light among LED elements of primary colors. However, even if there is such fluctuation, by further adding means such as selection of LED elements and adjustment of electric current applied to LED elements, the fluctuation in an amount of light among LED elements of a single primary color and the fluctuation in an amount of light among LED elements of primary colors can be eliminated almost completely.

According to the surface lighting device shown in FIG. 19, since LEDs of the respective primary colors are arranged to be contiguous with each other in square shape groups, and the square shape groups are arranged in a Δ shape, there is an effect that LED elements can be arranged in the surface without deviation and, in the case in which attention is paid to single primary colors, a uniform amount of light can be obtained in the surface, and unevenness of luminance can be reduced.

Moreover, in one part in the center of the Δ arrangement in which LED elements are not arranged, when sums of amounts of light of LEDs of the respective primary colors placed at vertexes of the Δ arrangement, that is, a sum of amounts of light of the red LEDs, a sum of amounts of light of the blue LEDs, and a sum of amounts of light of the green LEDs are compared, in the case in which an average value of sums of amount is assumed to be 100%, the LED square shape groups are arranged such that the sum of amounts of light of the LEDs of the respective primary colors is within the range of 75% to 125% by adjusting the row interval D1, the column interval D2, and the arrangement angle θ. Thus, there is an effect that unevenness of color in the case in which light is mixed can be reduced. In addition, in two parts in the center of the diamond arrangement in which LED elements are not arranged, the LED square shape groups are also arranged such that the sum of amounts of light of the LEDs of the respective primary colors is within the range of 75% to 125% by the same operation as that for the one part in the center. Thus, there is an effect that unevenness of color in the case in which light is mixed can be further reduced. Note that, although red, blue and green are selected as a combination of plural colors, the same effect can be realized by further adding cyan, magenta, yellow and the like which are intermediate colors.

Figure 20:
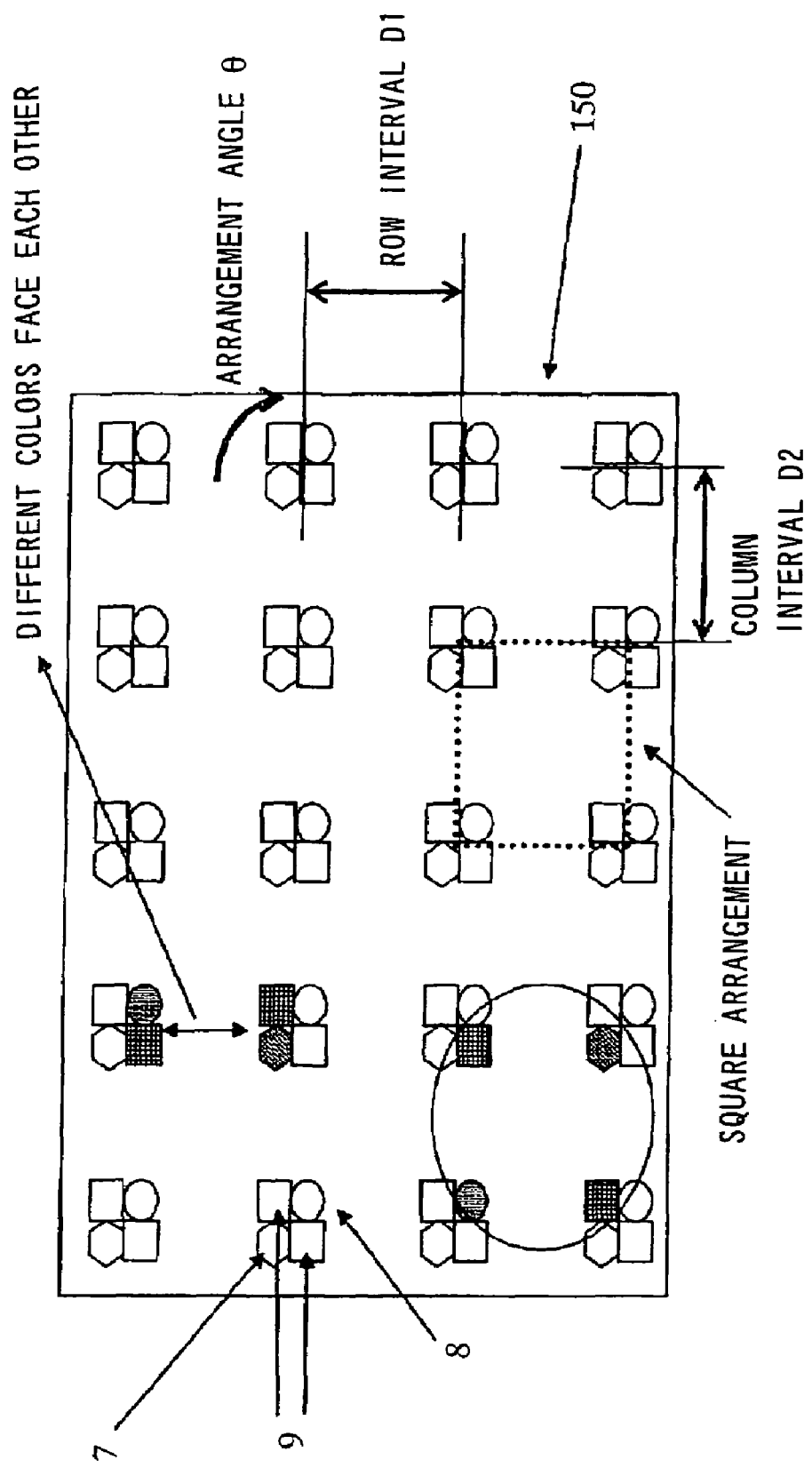
FIG. 20 is a diagram showing an arrangement of light-emitting elements in a surface lighting device in accordance with a thirteenth embodiment of the present invention.

FIG. 20 shows an arrangement of light-emitting element groups in a surface lighting device 150. The surface lighting device 150 is characterized by including: a surface light source constituted by arranging four LED elements, which are constituted by the red light-emitting LEDs 7, the blue light-emitting LEDs 8, and the green light-emitting LEDs 9, to be contiguous with each other in a shape of groups of a square shape (hereinafter referred to as "square shape groups") and arranging the plural square shape groups in a square shape (hereinafter referred to as "square arrangement"); the reflection plate not shown in the figure which fills spaces among the light-emitting LEDs of the respective primary colors constituting the surface light source; the substrate on which the LED elements and the reflection plate are set and which is made of a material such as an aluminum plate and also serves as a heat radiation plate; and the diffusion plate which is located in an upper position and is transparent but diffuses light. In addition, the surface lighting device 150 is characterized in that, by adjusting the row interval D1, the column interval D2, and the arrangement angle θ among the square shape groups, when sums of amounts of light of the LEDs of the respective primary colors are compared in a center 1 of a blank area in which the light-emitting LED elements of the primary colors are not arranged, the sum of amounts of light is in a range between 75% and 125%. Here, the center 1 means a center of gravity of three LED square shape groups in the square arrangement. Incidentally, in the case in which attention is paid to two LED Δ groups which face each other when the LED Δ groups are in the square arrangement, it is desirable that the LED Δ groups are arranged such that light-emitting elements of different colors face each other. This is because the characteristic concerning the sum of amounts of light can be easily attained.

Note that, in arranging the LED square shape groups such that the sum of amounts of light of the LEDs of the respective primary colors is within the range of 75% to 125%, it is assumed that there is almost no fluctuation in an amount of light among LED elements of a single primary color and fluctuation in an amount of light among LED elements of primary colors. However, even if there is such fluctuation, by further adding means such as selection of LED elements and adjustment of electric current applied to LED elements, the fluctuation in an amount of light among LED elements of a single primary color and the fluctuation in an amount of light among LED elements of primary colors can be eliminated almost completely.

According to the surface lighting device shown in FIG. 20, since LEDs of the respective primary colors are arranged to be contiguous with each other in square shape groups, and the square shape groups are arranged in a square shape, there is an effect that LED elements can be arranged in the surface without deviation and, in the case in which attention is paid to single primary colors, a uniform amount of light can be obtained in the surface, and unevenness of luminance can be reduced.

Moreover, in one part in the center of the square arrangement in which LED elements are not arranged, when sums of amounts of light of LEDs of the respective primary colors placed at vertexes of the square arrangement, that is, a sum of amounts of light of the red LEDs, a sum of amounts of light of the blue LEDs, and a sum of amounts of light of the green LEDs are compared, in the case in which an average value of sums of amount is assumed to be 100%, the LED square shape groups are arranged such that the sum of amounts of light of the LEDs of the respective primary colors is within the range of 75% to 125% by adjusting the row interval D1, the column interval D2, and the arrangement angle θ. Thus, there is an effect that unevenness of color in the case in which light is mixed can be reduced. Note that, although red, blue and green are selected as a combination of plural colors, the same effect can be realized by further adding cyan, magenta, yellow and the like which are intermediate colors.

Incidentally, in the surface lighting devices 120 to 150 shown in FIGS. 17 to 20, a light-emitting element group is constituted by three to four light-emitting elements. However, the light-emitting element group may be constituted by more light-emitting elements. In addition, as types of colors of light-emitting elements constituting the light-emitting element group, blue, red and green, which are primary colors, are used in the above description. However, the light-emitting element group may be a combination of blue, red, green, cyan, magenta, yellow, and the like and arranged at vertexes of a polygon, which has six or more sides, to be contiguous with each other.

Figure 21:
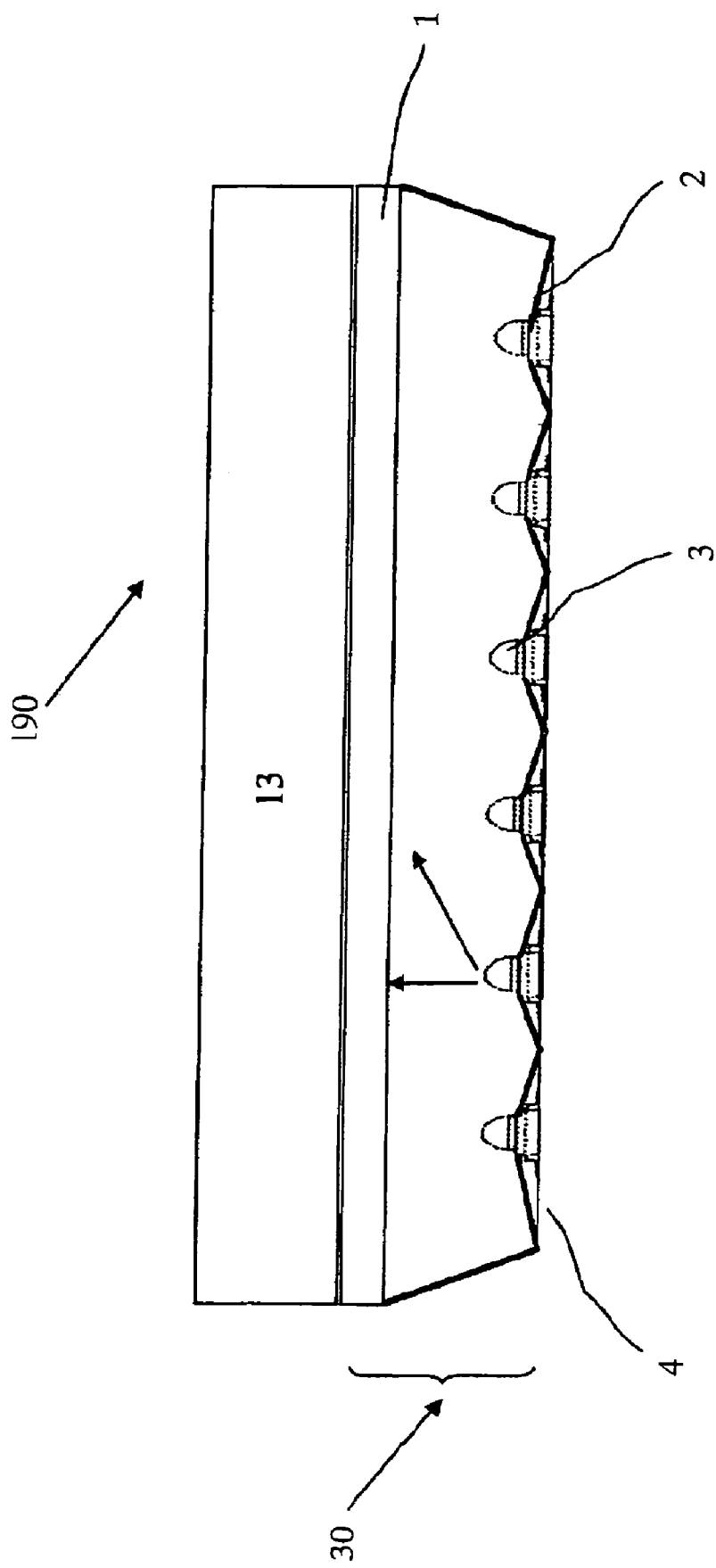
FIG. 21 is a sectional view of a display portion of a liquid crystal display device in accordance with a fourteenth embodiment of the present invention.
Figure 22:
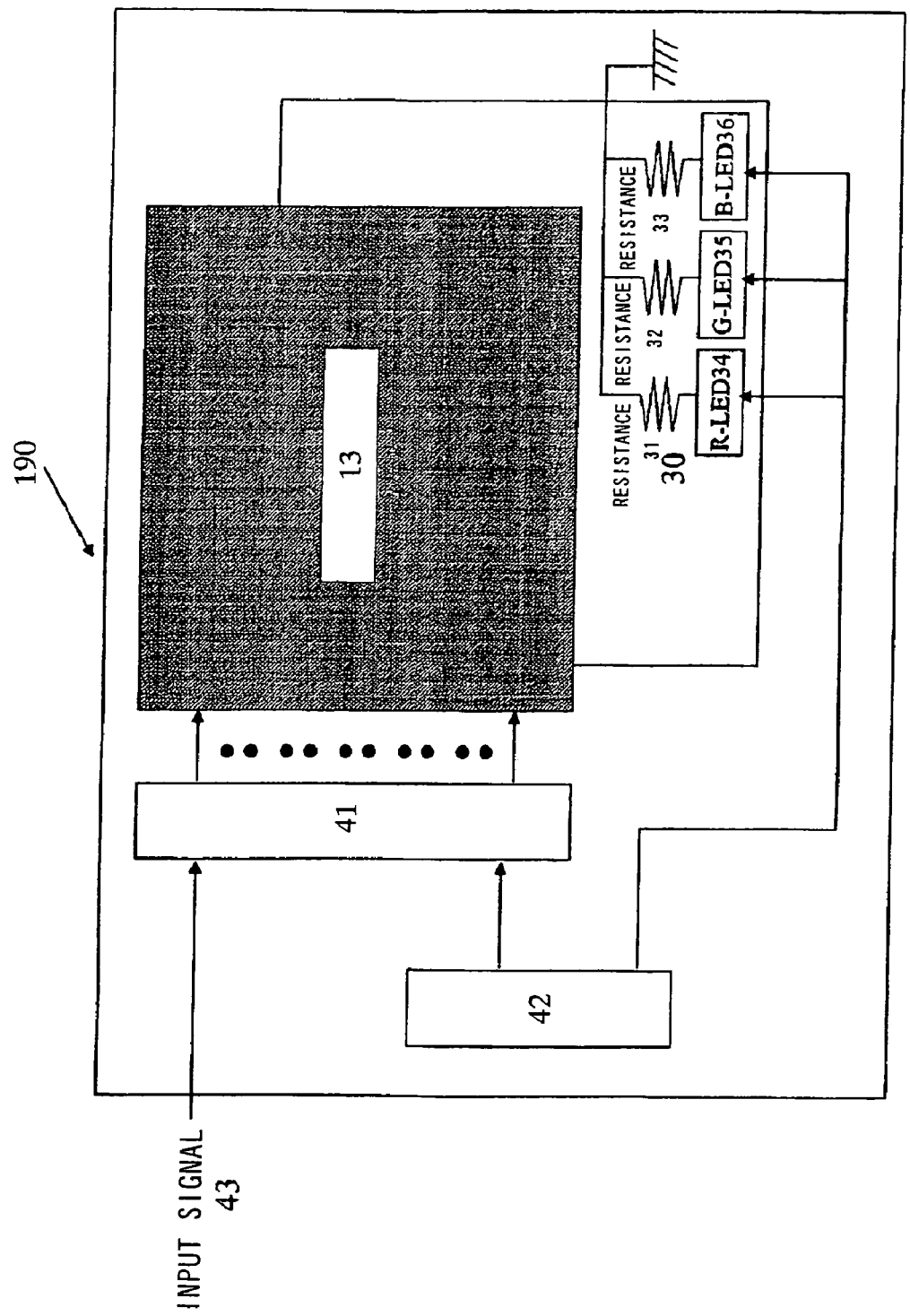
FIG. 22 is a diagram showing the liquid crystal display device in accordance with the fourteenth embodiment of the present invention.
Figure 23:
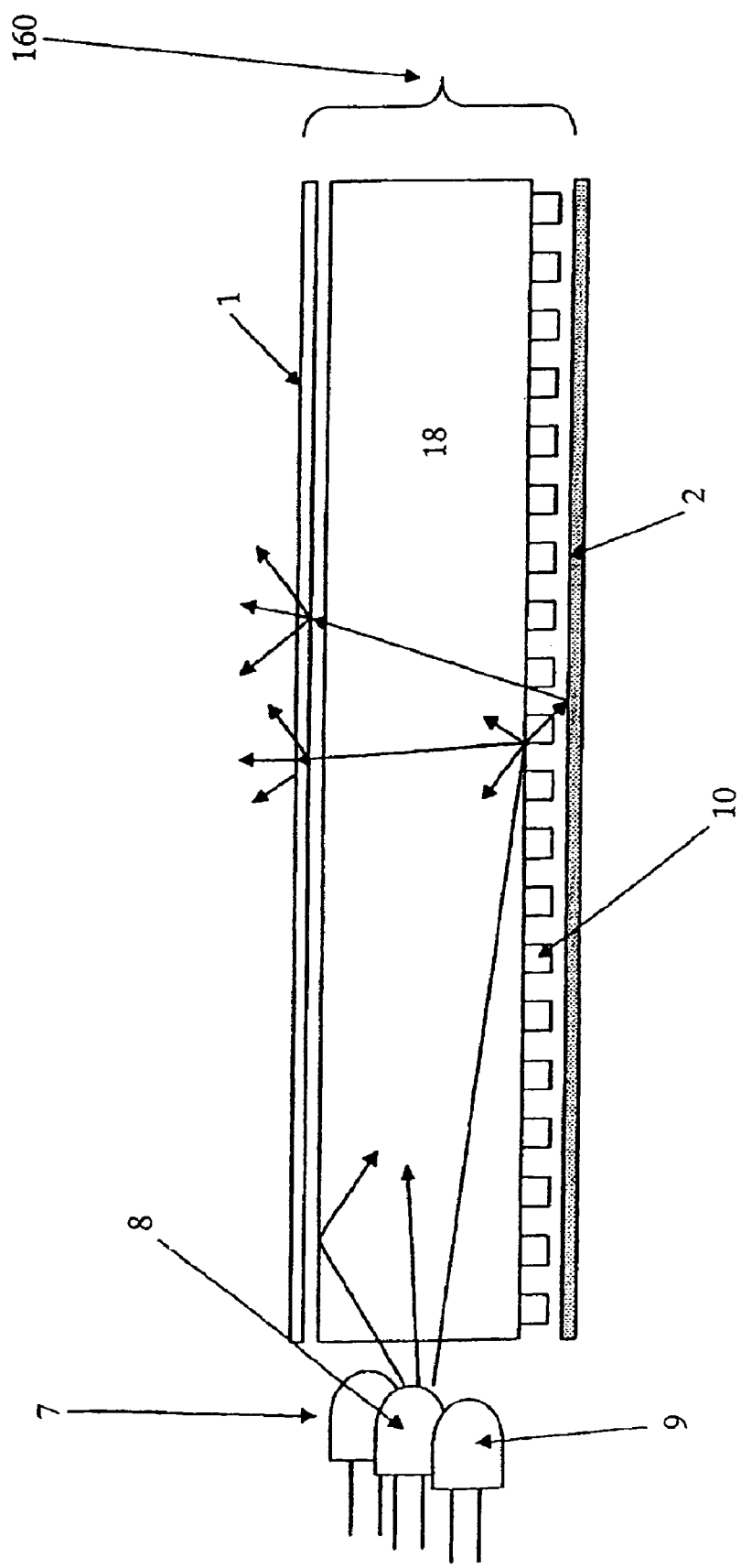
FIG. 23 is a diagram showing a display device of a conventional example 1.
Figure 24:
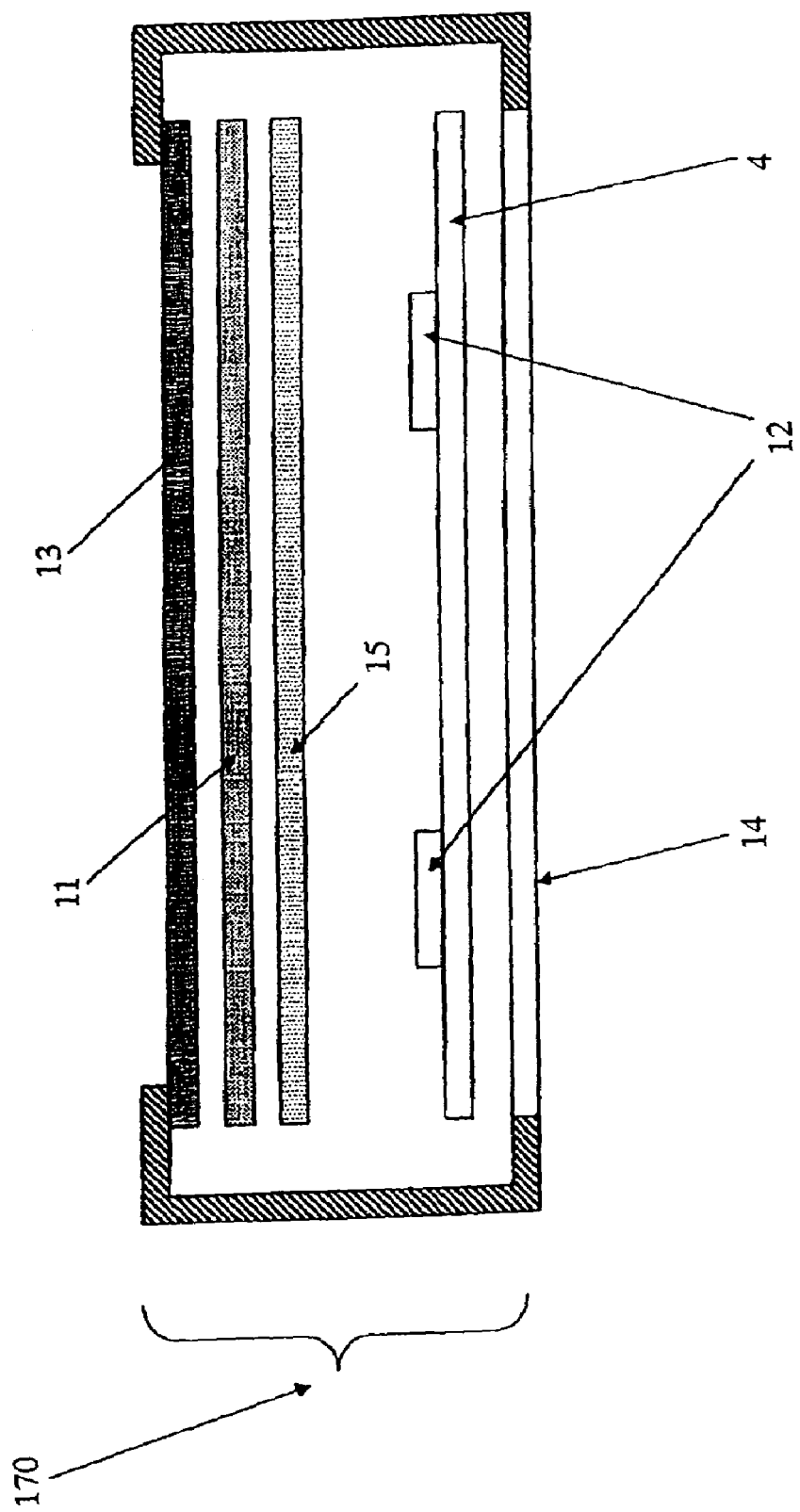
FIG. 24 is a diagram showing a liquid crystal display device of a conventional example 2.
Figure 25:
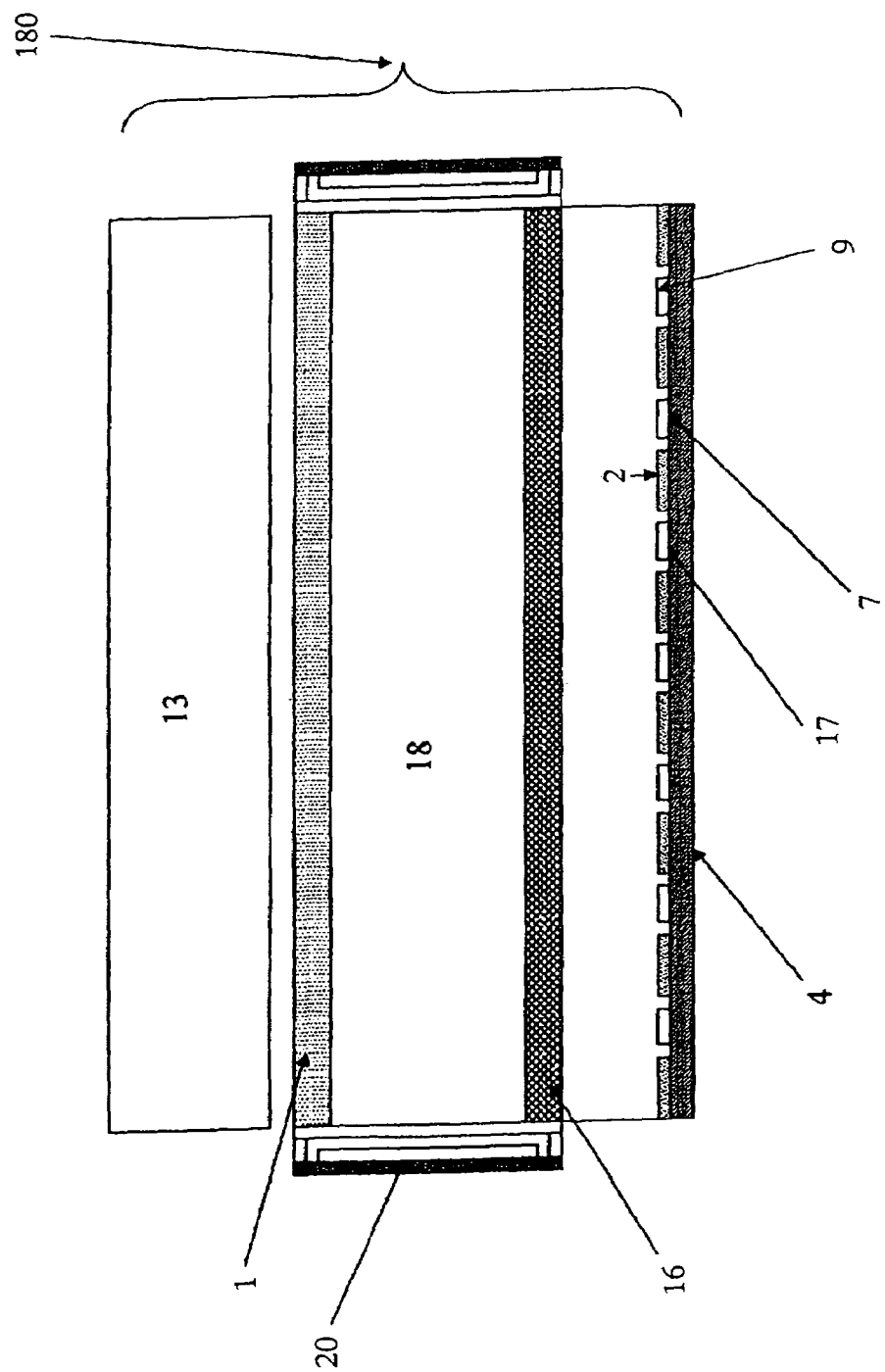
FIG. 25 is a diagram showing a liquid crystal display device of a conventional example 3.
Figure 26:
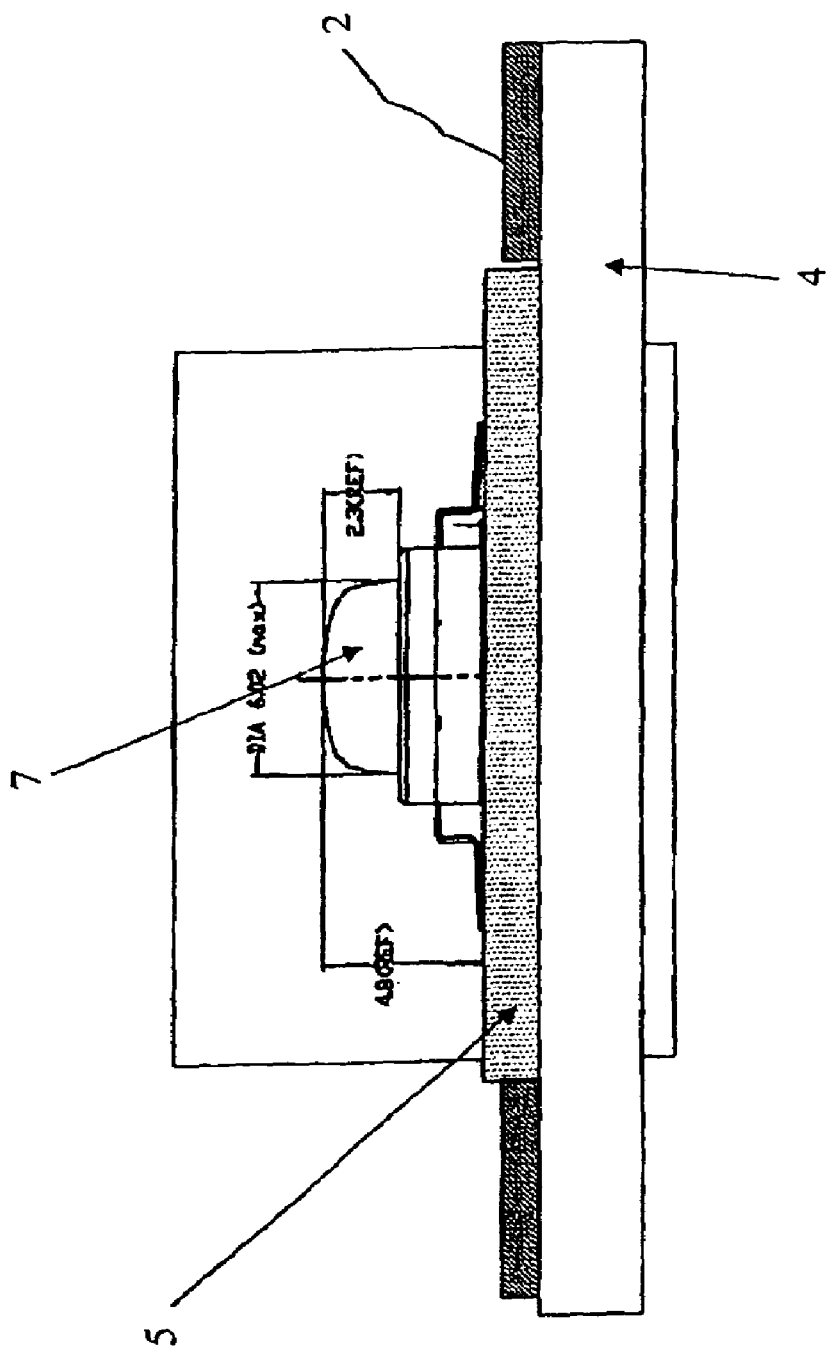
FIG. 26 is a diagram showing an example of structures of an LED portion and a reflection plate in the conventional example 3.

Next, a liquid crystal display device 190 shown in FIG. 22 is characterized by including, as shown in a sectional view of FIG. 21: a display portion which constitutes the surface lighting device 30 shown in FIG. 1 with a backlight unit and the liquid crystal display panel 13; a liquid crystal display panel drive portion 41 which operates with an input signal 43 inputted; and a power supply 42, and in that the surface lighting device 30 further includes: a resistor 31 which adjusts an electric current flowing to the red LEDs constituting the linear light source R-LED34; a resistor 32 which adjusts an electric current flowing to the green LEDs constituting the linear light-source G-LED35; and a resistor 33 which adjusts an electric current flowing to the blue LEDs constituting the linear light source B-LED36. Since the surface lighting device shown in FIG. 1 has less unevenness of luminance and is bright, there is an effect that the liquid crystal display device can obtain uniform and bright display.

Note that, in the liquid crystal display device 190, the surface lighting device 30 shown in FIG. 1 is used for the backlight unit. However, it is also possible to manufacture a liquid crystal display device using the surface lighting devices 40 to 150 shown in FIGS. 4, 7, 8, 10, 11, 12, 14, 15, 17, 18, 19 and 20. In that case, the effects of the respective surface lighting devices can be obtained in the liquid crystal display device.

According to the first and the second aspects of the present invention, as described in the first embodiment, a substrate surface cover rate by a reflection plate can be increased and, even in the case in which white light is used for a backlight unit, a surface lighting device with unevenness of luminance prevented can be provided.

In addition, according to the third and the fourth aspects of the present invention, as described in the second to the fourth embodiments, even in the case in which white light is used for a backlight unit, a surface lighting device with unevenness of color prevented can be provided.

Moreover, according to the fifth aspect of the present invention, as described in the fourth embodiment, although white light is used for a backlight unit, a liquid crystal display device, which incorporates a surface lighting device with unevenness of color or unevenness of luminance prevented, can be provided.

What is claimed is:

1. A surface lighting device comprising:

a surface light source in which light-emitting element groups having three light-emitting elements, which correspond to three primary colors of light, arranged to be contiguous with vertexes of a triangle are arranged in a matrix shape;

a substrate on which the light-emitting element groups are arranged; and a diffusion plate which is located above the surface light source, wherein the light-emitting element groups are arranged to be deviated every other column or row such that a positional relation among the light-emitting element groups is a delta shape, and a row interval, a column interval, and an arrangement angle of the light-emitting element groups are adjusted such that, when it is assumed that an average amount of light calculated from a sum of amounts of light of the single color light-emitting elements is 100%, a sum of amounts of light of the respective single color light-emitting elements at a center of gravity of the delta shape and a center of gravity of a diamond shape formed by two delta shapes is between 75% and 125%.

* * * * *